(12) United States Patent  
Faraone et al.

(10) Patent No.: US 10,873,348 B2  
(45) Date of Patent: Dec. 22, 2020

(54) ANTENNA SYSTEM FOR A PORTABLE COMMUNICATION DEVICE

(71) Applicant: MOTOROLA SOLUTIONS, INC, Chicago, IL (US)

(72) Inventors: Antonio Faraone, Fort Lauderdale, FL (US); Giorgi Bit-Babik, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/393,890

(22) Filed: Apr. 24, 2019

(65) Prior Publication Data

US 2020/0343918 A1    Oct. 29, 2020

(51) Int. Cl.
*H04B 1/00* (2006.01)
*H04B 1/3827* (2015.01)
*H01Q 1/24* (2006.01)
*H01Q 1/52* (2006.01)
*H04B 1/18* (2006.01)

(52) U.S. Cl.
CPC ........... *H04B 1/0064* (2013.01); *H01Q 1/241* (2013.01); *H01Q 1/521* (2013.01); *H04B 1/18* (2013.01); *H04B 1/3827* (2013.01)

(58) Field of Classification Search
CPC ...... H04B 1/0064; H04B 1/18; H04B 1/3827; H01Q 1/241; H01Q 1/521
See application file for complete search history.

(56) References Cited

U.S. PATENT DOCUMENTS

| | | | |
|---|---|---|---|
| 7,102,577 B2 | 9/2006 | Richard et al. | |
| 8,830,131 B1 * | 9/2014 | Doane | H01P 5/222 343/722 |
| 9,161,386 B1 * | 10/2015 | Beghini | H04W 88/06 |
| 9,496,913 B2 * | 11/2016 | King | H04B 1/44 |

(Continued)

FOREIGN PATENT DOCUMENTS

| | | | | |
|---|---|---|---|---|
| EP | 1976131 A1 | 10/2008 | | |
| WO | WO-2005060043 A2 * | 6/2005 | | H03H 7/185 |

(Continued)

OTHER PUBLICATIONS

Jasteh, Donya: "Isolation Enhancement in a Dual Port Antenna", A thesis submitted to the University of Birmingham for the degree of Master of Philosophy, School of Electronic, Electrical and Computer Engineering, The University of Birmingham Oct. 2011, all pages.

(Continued)

*Primary Examiner* — Christopher M Brandt
(74) *Attorney, Agent, or Firm* — Barbara R. Doutre

(57) ABSTRACT

An antenna system for a portable wireless communication device is provided having a first antenna and a second antenna, the first and second antennas being proximally located causing electromagnetic coupling therebetween. An isolator is coupled with the first and second antennas and the first and second RF transceivers at respective interface ports. The isolator Comprises a radio frequency (RF) coupler featuring four RF coupler ports. The four RF coupler ports are coupled to respective phasor-shaping networks at each of the four RF coupler ports. The first and second RF transceivers operate independently in respective frequency bands.

18 Claims, 12 Drawing Sheets

(56) References Cited

U.S. PATENT DOCUMENTS

| | | | | |
|---|---|---|---|---|
| 2010/0157858 A1* | 6/2010 | Lee | ................ | H01Q 9/40 370/297 |
| 2013/0170530 A1* | 7/2013 | Yoshikawa | ................ | H04B 7/0682 375/224 |
| 2014/0266866 A1* | 9/2014 | Swirhun | ................ | G01S 7/026 342/188 |
| 2015/0188215 A1* | 7/2015 | Jarvis | ................ | G06F 1/1656 343/702 |
| 2017/0063425 A1* | 3/2017 | Khlat | ................ | H01P 5/18 |
| 2017/0064773 A1* | 3/2017 | Anderson | ................ | H04L 5/14 |
| 2019/0334228 A1* | 10/2019 | Haridas | ................ | H01Q 1/2283 |

FOREIGN PATENT DOCUMENTS

| | | | |
|---|---|---|---|
| WO | 2010108772 | A1 | 9/2010 |
| WO | 2019005145 | A1 | 1/2019 |

OTHER PUBLICATIONS

Mahmood, Faraz et al.: "Decoupling Techniques of Compact and Broadband MIMO Antennas for Handheld Devices", 2012 6th European Conference on Antennas and Propagation (EUCAP), Mar. 26-30, 2012, all pages.

The International Search Report and the Written Opinion corresponding patent application No. PCT/US2020/024609 filed Mar. 25, 2020, dated Jun. 26, 2020, all pages.

Editorial Team; "What is a Directional Coupler?", https://www.everythingrf.com/community/what-is-a-directional-coupler, Aug. 14, 2018, downloaded from the Internet: Oct. 7, 2020, all pages.

"Directional Coupler S-Matrix derivation | Directional Coupler scattering matrix", https://www.rfwireless-world.com/Terminology/Directional-Coupler-S-Matrix-Derivation.html#:~:text=Rf%20Directionar%20coupler%20consists%20of,from%20the%20main%20transmission%20path, downloaded from the internet: Oct. 7, 2020, all pages.

* cited by examiner

ANTENNA SYSTEM FOR A PORTABLE COMMUNICATION DEVICE

FIELD OF THE DISCLOSURE

The present invention relates generally to antennas and more particularly to antennas for multi-band applications of a portable communication device featuring multiple coexisting radio-frequency transceivers.

BACKGROUND

Portable wireless communication devices, such as portable two-way radios, rely on good antenna performance for reliable communications. Such devices are often used by public-safety agencies such as police departments, fire departments, emergency medical responders, to name a few. There is an increased interest in the public-safety arena for portable two-way radios that enable operation over multiple communication protocols supported by air interfaces operating across multiple communication frequency bands to enhance interoperability amongst different public-safety agencies or to augment the range of mission-critical services (e.g. voice, data) available to portable radio end-users. For example, there is a particular interest in incorporating LTE (Long Term Evolution) and LMR (Land Mobile Radio) bands of operation into a single portable communication device that can operate simultaneously in LTE bands (e.g. for mission-critical video streaming) and LMR bands (e.g. for mission-critical voice messaging) in both handheld and body worn usage applications. The existence of proximate, adjacent and overlapping bands of operation between LTE and LMR transceivers presents challenges in the design of antenna systems for such devices. Space constraints, limited antenna isolation causing loss of receiver sensitivity and spurious out of band emissions, as well as radiated efficiency degradation due to antenna coupling losses, particularly in adjacent or overlapping frequency bands, can negatively impact reliable radio device operation by hampering, restricting, or even impeding the seamless coexistence of multiple transceivers that should be operating concurrently.

Accordingly, there is a need for an improved antenna system for a portable communication device that can enable coexistence of different transceivers operating in proximate, adjacent or overlapping frequency bands of interest, such as the aforementioned LTE-LMR coexistence.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
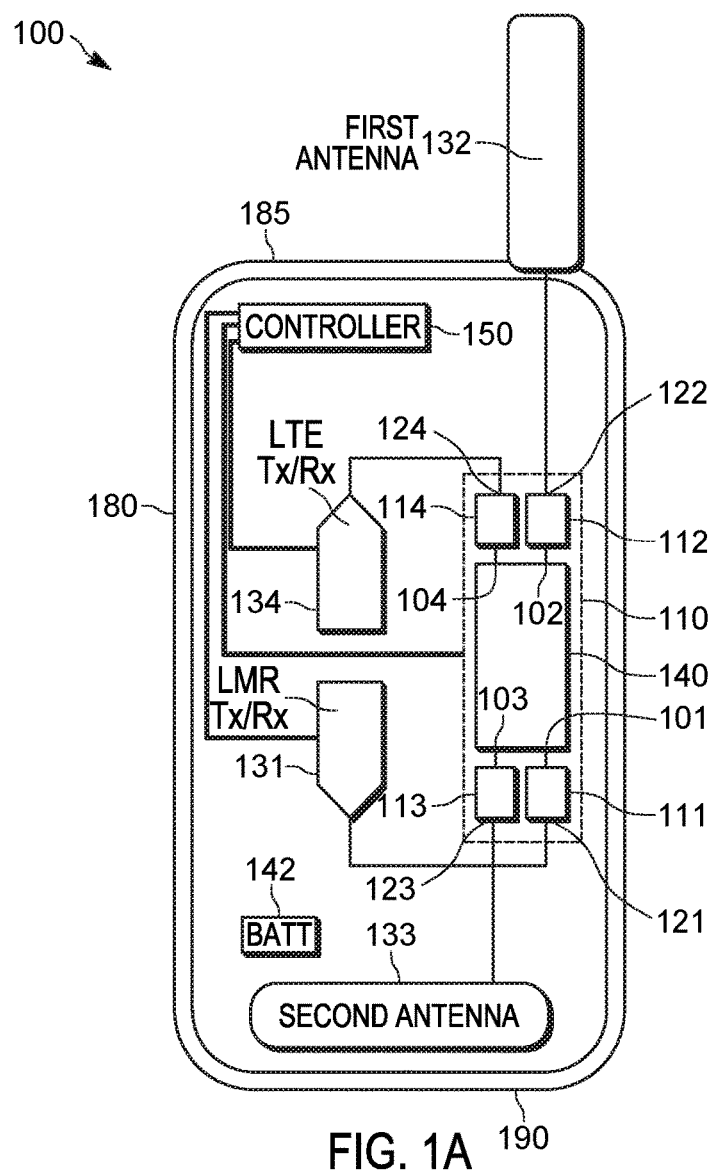
FIG. 1A is a block diagram of an antenna system for a portable communication device formed in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an antenna system that enables improved operational co-existence of different wireless communication systems with proximate, adjacent or overlapping frequency bands within a single portable communication device. The antenna system can provide operation at one or more frequency bands, such as for example those used in Land Mobile Radio (LMR) communications, and the antenna system can further provide operation over a different communication system, such as for example Long Term Evolution (LTE) communications. LMR communications may operate over a very high frequency (VHF) band (about 136-174 MHz), and/or an ultra high frequency (UHF) band (about 380-520 MHz), and/or a 7/800 MHz frequency band (about 764-869 MHz) corresponding to public-safety communication services in certain world regions, e.g. North America. LTE communications may operate over licensed frequency bands defined in 3GPP Technical Specification 36.101 (April 2019) in the 700-800 MHz range, such as Band 5 (824-894 MHz), Band 12 (699-746 MHz), Band 13 (746-787 MHz), Band 14 (758-798 MHz), Band 18 (815-875 MHz), Band 20 (791-862 MHz), as well as others. Hence, proximate, adjacent or overlapping bands may occur between the LMR 7/800 MHz frequency band and a number of LTE bands. While LMR and LTE communications may need to occur independently of each other to maximize users' benefits, issues may arise when certain LMR and LTE communications occur simultaneously, wherein those communications are occurring in proximate, adjacent or overlapping frequency bands. Examples of such simultaneous communication may occur when: transmitting on LMR, while receiving on LTE; transmitting on LTE while receiving on LMR; transmitting on both LMR and LTE simultaneously; or receiving on LMR and LTE simultaneously. In the absence of sufficient RF isolation between the respective radio-frequency (RF) transceivers, such simultaneous communications would be negatively impacted under proximate, adjacent or overlapping frequency band operating conditions.

Even though a portable communication device may be designed and programmed so different transceivers work in different operating bands which do not technically overlap, it is appreciated that the frequency selectivity of the respective antennas is typically not sharp enough to reject RF signals in those proximate or adjacent bands, while RF filters in the respective RF chains may not provide enough rejection either. Indeed, there are even cases where the transceivers must necessarily operate concurrently over respective bands that feature an overlapping frequency swath, thus neither antenna nor filter frequency selectivity may provide relief. Unless time scheduling of the respective transmit and receive functions of the two transceiver is possible, this being rarely the case since it would require the respective air interfaces to be synchronized, high RF isolation between the respective antennas represents the only viable path to mitigate mutual interferences between transceivers, radiated efficiency degradation due to antenna coupling, which may result in potential disruptions of the respective mission-critical functions. However, achieving high RF isolation between antennas installed on the same radio device, when the overall radio device size is comparable with the operating wavelengths of the transceivers, as it is the case for public-safety two-way radios operating in the aforementioned bands, is overly challenging especially when both antennas share the radio device ground structure as their respective electrical counterpoise. In fact, using the radio device ground structure as an antenna electrical counterpoise allows unbalanced feeding of a single antenna terminal (as opposed, for instance, to differential feeding of two antenna terminals), typically resulting in wider antenna operating band and compact size, both these characteristics being very desirable in portable wireless communication devices. RF isolation between antennas would increase significantly if one of the antennas were operated differentially and exhibited substantial symmetries and the other were fed unbalanced, but the size of the differential antenna and its relatively narrow bandwidth would be undesirable, particularly in modern radio devices that frequently host four to eight antennas (e.g., including GPS, several WiFi and several LTE antennas), operate over a large number of communication bands across multiple spectrum swaths, and must be ergonomic thus light and small in size.

Due to the above, the challenge of realizing high RF isolation between multiple unbalanced antennas hosted in a portable radio device was frequently approached in terms of interfering signal cancellation, mostly effected in the RF circuitry domain, which can be implemented if a portion of the interfering transceiver signal is sampled and then subtracted at the victim transceiver. Both active (e.g. involving non reciprocal active circuitry) and passive (e.g. only involving reciprocal RF structures and components) methods have been investigated. Active cancellation requires additional electronics, battery drain, cost, and is bound to introducing spurious RF noise that may eventually limit the attainable interference cancellation. Additionally, active cancellation does not allow addressing the intrinsic loss of receive sensitivity and total radiated power affecting both RF transceivers due to respective antenna radiation efficiency degradation produced by substantial mutual coupling between antennas. Furthermore, active cancellation becomes increasingly inefficient when dealing with large interfering signal levels, e.g. when mutual antenna coupling is large and/or the transmit power is large. Therefore active cancellation may be impractical, and furthermore it is unhelpful when both transceivers are simultaneously receiving while none is transmitting, however passive cancellation can be helpful even in this case, since isolating the transceivers by means of a low loss, reciprocal network makes the resulting respective radiation patterns uncorrelated and maximizes the respective radiation efficiencies. Some past passive cancellation approaches have featured passive circuitry employed to decouple antennas provided they are in specific symmetric arrangements. However, having to realize specific antenna symmetries limits antenna placement, design, frequency response options, thus resulting overly restricting for portable radios. Thus, a solution enabling mutual interference cancellation in the case of coupled antennas on a portable radio without introducing significant design freedom limitations, or adding significant cost and complexity, or degrading other important features such as battery life, is needed. Furthermore, such a solution should not impair the radio functionality in supported communication bands that are not necessarily proximate, adjacent or overlapping. For instance, concurrent operation of the LMR transceiver in the VHF and UHF bands, where interference cancellation may not be needed at all, should not be impaired by interference cancellation being effected in the 7/800 MHz band.

The antenna system described herein addresses the issues of simultaneous operation of at least two communication protocols (such as LMR and LTE) in a portable wireless communication device, particularly over proximate, adjacent or overlapping operating bands. A portable radio incorporating one of various embodiments of the antenna system is particularly advantageous for public-safety end-users, such as those employed in police departments, fire departments, emergency medical responders, and the like, as well as the military. Such agencies desire a single communication device with functionality that handles concurrent mission-critical communications through both LMR and LTE communication protocols. Embodiments of said antenna system advantageously enable simultaneous operation by different transceivers over distinct communication protocols, even when those different transceivers operate over proximate, adjacent or overlapping frequency bands, without restricting their functionalities or requiring any synchronization therebetween.

FIG. 1A illustrates a portable wireless communication device 100 having an antenna system formed in accordance with some embodiments. The portable wireless communication device 100 comprises a housing 180, a radio frequency (RF) isolator 110 and four functional elements, which comprise first RF transceiver 131, second RF transceiver 134, first antenna 132, second antenna 133, interfacing with said RF isolator. First RF transceiver 131, first antenna 132, second antenna 133, and second RF transceiver 134 will sometimes be referred to as interfacing functional elements. Isolator 110 interfaces electrically with first RF transceiver 131 at interface port 121, with second RF transceiver 134 at interface port 124, with first antenna 132 at interface port 122, and with second antenna 133 at interface port 123, thus RF signals can flow in and out of isolator 110 at said interface ports 121, 122, 123, 124, coming from and going to respective interfacing functional elements 131, 132, 133, 134. Therefore, for the purposes of description, said interfacing functional elements 131, 132, 133, 134 may incorporate RF transmission lines or other RF interconnections (e.g. board-to-board interconnects) to and between transceiver parts (e.g. filters, switches, duplexers, etc.) and to isolator 110, as well as to and between antenna parts (e.g., antenna matching circuits, impedance transformers, RF stubs, tunable capacitors, etc.) and to isolator 110. Thus the sketched lines connecting interface ports 121, 122, 123, 124 with the respective functional elements 131, 132, 133, 134 serve to illustrate RF signal pathways in accordance with the embodiments. Consequently, interface ports 122, 123 are taken to represent respective feedpoints of first antenna 132 and second antenna 133. The portable wireless communication device 100 is powered by a battery 142 and provides at least two co-existing wireless communication interfaces via the first and second RF transceivers 131, 134 under the control of a microprocessor controller 150. The first antenna 132 is preferably located at a top end 185 of the portable communication device, and the second antenna 133 is preferably located near a bottom end 190 of the portable communication device. Antennas 132 and 133 may operate relying on ground structures (not shown) hosted within housing 180 (e.g. printed circuit boards, metal stiffeners and chassis, and the like, which may be electrically coupled to each other) as their respective electrical counterpoise enabling the establishment of radiating RF currents in order to attain respective radiated performances. Typically, despite the maximal separation attained when placed at or about opposite ends 185, 190 of housing 180 as in FIG. 1A, said antennas are substantially electromagnetically coupled and thus may provide, in the absence of isolator 110, an interference path between RF transceivers connected at the respective feedpoints, said interference path being characterized by the transmission RF scattering parameter that can be measured at interface ports 122 and 123. In reciprocal networks, such a transmission RF scattering parameter is also referred to as "mutual coupling" or "mutual antenna coupling", and does not depend on which of the transceivers transmits. The behavior versus frequency of reflection and transmission RF scattering parameter can be conventionally measured using a network analyzer instrument, which would also provide the frequency dependence of the respective antenna impedances. When transceivers are directly connected to interface ports 122, 123, in the absence of isolator 110, said RF scattering parameters would provide means to estimate the potential level of mutual interference between transceivers.

The first RF transceiver 131 may operate in a single frequency band or multiple bands, and for the purposes of this application the first RF transceiver is considered to operate also in a band that is proximate to, adjacent to or partially overlapping with at least one of the operating bands of the second RF transceiver 134. The first RF transceiver 131 may be, for example, an LMR transceiver, and the second RF transceiver 134 may be, for example, an LTE transceiver. The first antenna 132 may be referred to as an LMR antenna and the second antenna 133 may be referred to as an LTE antenna. For the purposes of description, the first RF transceiver 131 will also be described as an LMR transceiver 131 and the second RF transceiver 134 will also be described as an LTE transceiver 134. Such a description is useful since, traditionally, public-safety two-way radios feature an external, monopole-like antenna placed near the top edge 185, and in the following it will be explained that first antenna 132 may support communications over the aforementioned VHF and UHF bands besides the 7/800 MHz band, with only the latter being proximate to, adjacent to or partially overlapping with one or more of the aforementioned LTE bands. It is to be appreciated that the use of LMR and LTE descriptors is intended for illustration purposes and that the concepts pertaining to the antenna system can be applied to other co-existing communication protocols supported by air interfaces having proximate, adjacent or overlapping frequency bands of operation.

The LMR transceiver 131 may be configured to operate in the VHF and/or UHF, and/or 7/800 MHz frequency bands using LMR protocols. The LTE transceiver 134 may be configured to operate in LTE bands usually above 600 MHz, for example Band 5, Band 8, Bands 12-20, Bands 26-28, to name a few, using an LTE protocol. Hence, there are occasions when normal operation of portable wireless communication device 100 will feature the LMR 7/800 MHz band and at least an LTE band that are proximate, adjacent or overlapping, thus requiring the antenna system provided herein to mitigate mutual interference and enable operational co-existence.

For portable two-way radios featuring both LMR and LTE transceivers, high RF isolation between the first and second antennas 132, 133 is desirable. Here and in the following, the terminology "mutual coupling" and "isolation" will be frequently used interchangeably, with the understanding that in linear terms the respective figures are the reciprocal of each other, thus they become the opposite of each other when expressed in dB terms. If isolation is poor, both LMR and LTE performances and functionalities will be negatively impacted. For example, the LTE transceiver out-of-band emissions (OOBE) may negatively impact the LMR receiver sensitivity in an adjacent band causing loss of LMR receive range. Also, LMR signal interference entering the LTE transceiver may cause inter-modulation (IM) products that may negatively impact LTE receiver sensitivity and cause undesirable electromagnetic interference, or high level LMR interfering signals may physically damage the LTE receiver. Also, poor isolation between antennas degrades the respective attainable radiation efficiency, thus reducing the radiated receiver sensitivity (e.g. the so-called Total Isotropic Sensitivity) and the radiated power (e.g. the so-called Total Radiated Power). Battery life of battery 142 will also be negatively impacted if LMR and LTE transceivers 131, 134 are required to operate at higher transmit power levels to compensate for loss of communication range due to antenna coupling losses occurring due to the dissipation of transmitted power from one transceiver into the RF front-end circuitry of the other transceiver. Since the portable wireless communication device 100 may be handheld or belt worn, its size is constrained and even if the first and second antennas 132, 133 are respectively placed near a top end and a bottom end of the device housing they are still proximally located and typically share the device ground structure as their respective counterpoise, thus electromagnetic coupling therebetween is typically large, frequently in the 6-10 dB range in terms of transmission RF scattering parameter.

However, isolator 110 provides an effective means to increase significantly, by about 20 dB or more, the transceivers isolation thus reducing their mutual interference.

Figure 1B:
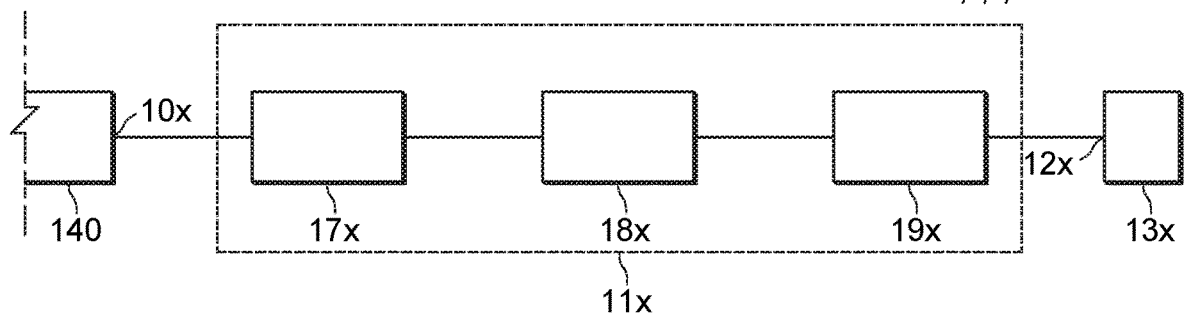
FIG. 1B is a block diagram of a phasor-shaping network within an antenna system for a portable communication device formed in accordance with some embodiments.

Isolator 110 may comprise a passive four-port RF coupler 140 interfacing at RF coupler ports 101, 102, 103, 104 with respective phasor-shaping networks (PSNs), shown in FIG. 1A as respective blocks 111, 112, 113, 114, said PSNs being multi-port RF networks employed to condition the phasors (i.e. respective magnitudes and phases) of RF signals being reflected by them and signals crossing them. PSNs may incorporate lumped and distributed RF circuits and transmission lines, as illustrated in FIG. 1B providing two-port PSNs according to some embodiments, featuring lumped two-port phasor-shaping circuits (PSCs) 171, 172, 173, 174 electrically coupled with RF coupler 140 at respective RF coupler ports 101, 102, 103, 104, said PSCs further interfacing with respective RF transmission lines 181, 182, 183, 184, said transmission lines interfacing with additional lumped two-port PSCs 191, 192, 193, 194, which interface with respective transceivers 131, 134 or antennas 132, 133 at the respective interface ports 121, 124, and 122, 123. Thus in some embodiments each PSN 111, 112, 113, 114 comprises a cascade of a PSC, an RF transmission line, and another PSC. This particular PSN structure presents several advantages as further explained in the following.

The generic PSC may incorporate fixed, switchable, and tunable lumped or distributed components. When a PSC incorporated switchable or tunable elements (e.g. a voltage-controlled tunable capacitor, or a single-port multiple-throw RF switch connected to multiple grounded lumped components such as resistors, capacitors, inductors), such a PSC is said to be reconfigurable, providing the ability to alter the respective PSN phasor-shaping function dynamically over time in order, for instance, to optimize isolator 110 performance is specific current bands of operation of RF transceivers 131, 134.

RF transmission lines 181, 182, 183, 184 may feature a single section, or multiple cascaded sections with suitable RF interconnections therebetween, each section featuring the same or distinct characteristic impedance, attenuation factor, guided wavelength behaviors along the section. For instance, each section may use a distinct physical realization technology, like coaxial cable, printed-circuit-board (PCB) microstrip trace, board-to-board interconnect, in order to satisfy desired product integration requirements and realize desired phasor-shaping functions. RF transmission lines 181, 182, 183, 184 may also incorporate reconfigurable sections (e.g. using phase-shifters in between transmission line sections) in order, for instance, to alter the respective PSN phasor-shaping function dynamically over time in order to optimize isolator 110 performance in specific situations of use of portable wireless communication device 100 (e.g. hand-held, body-worn, free-space), for instance in response to sensor-driven decision logic.

The RF coupler 140 may comprise a plurality of RF transmission lines causing RF signals to transfer amongst RF coupler ports 101, 102, 103, 104 according to the behavior of the RF scattering parameters characterizing the RF coupler 140. In some embodiments, coupled RF transmission lines can be employed to realize a desired behavior of said RF scattering parameters. In other embodiments, coupled lumped RF components can be employed to realize such a desired behavior. In further embodiments, a mix of geometrically lumped and distributed RF components, e.g. including distributed RF stubs besides lumped inductors or interdigitated capacitors besides lumped capacitors, may be employed for such a purpose.

Depending on the operating frequency bands supported by transceivers 131, 134, some RF coupler embodiments may present distinct advantages over other embodiments. For instance, when LMR transceiver 131 supports operation in VHF, UHF, and 7/800 MHz bands, and isolation with LTE transceiver 134 is only required about the 7/800 MHz band, it may be advantageous to ensure that isolator 110 attenuates minimally the RF signals traveling between LMR transceiver 131 and first antenna 132, when said antenna is capable of supporting communications over the VHF and UHF bands besides the 7/800 MHz band as it may be the case for monopole-like antennas for two-way radios. In this case, using an RF coupler whose operation is based on parallel, uniformly coupled RF transmission lines may represent an advantageous choice since such a coupler may be designed in such a way that one of the transmission line runs between RF coupler ports 101 and 102 while the other transmission line runs between RF coupler ports 103 and 104, and length-wise distributed inductive and capacitive RF coupling between these two transmission lines produces minimal RF signal transfer between lines in the VHF and UHF bands, while concurrently producing the proper level and delay of RF signal transfer between lines, thus between RF coupler ports 101, 102, 103, 104, in the 7/800 MHz band as required in order to optimize isolator 110 performances in the 7/800 MHz band. This is possible since RF signal transfer between parallel, uniformly coupled RF transmission lines is a growing function of frequency up to the RF coupler design frequency, which in this case is about the 7/800 MHz band (or even higher of physically shorter RF couplers are desired). In such a way, RF signals traveling between LMR transceiver 131 and first antenna 132 may be minimally attenuated in the VHF and UHF bands while simultaneously achieving high isolation between LMR and LTE transceivers 131, 134 about the 7/800 MHz band.

Figure 2A:
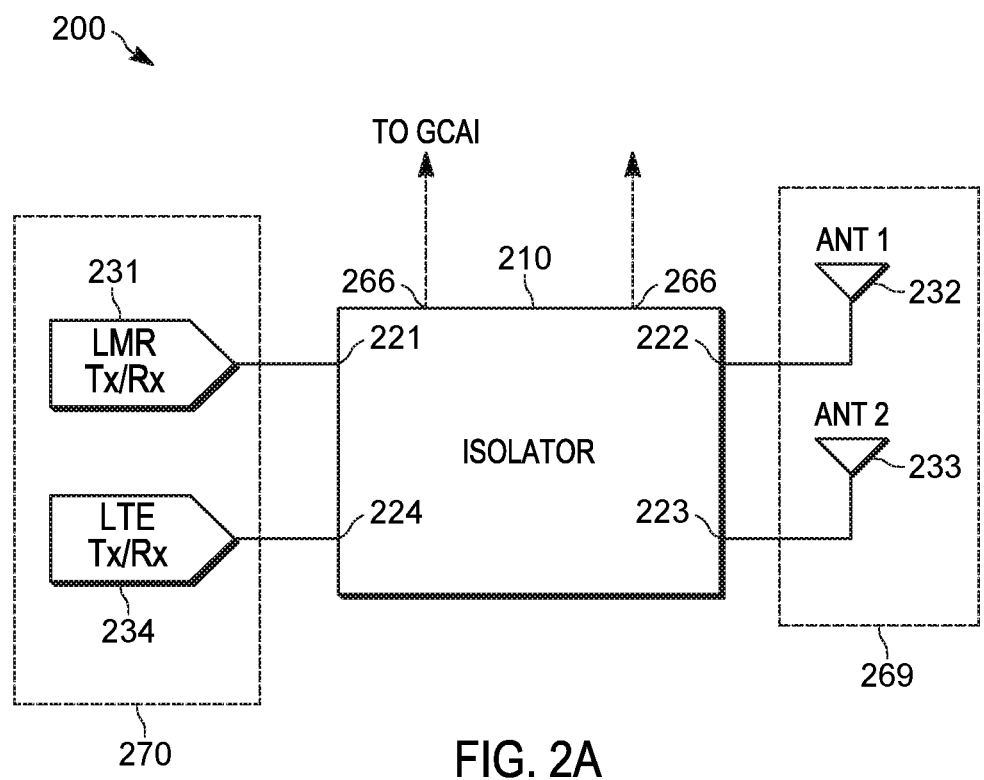
FIG. 2A is a block diagram of an antenna system in accordance with some embodiments.

As illustrated in FIG. 2A, which is a block diagram of an antenna system 200 hosted within portable communication device 100 in accordance with some embodiments, said antenna system an antenna block 269 featuring two antennas, a transceiver block 270 featuring two transceivers, and an isolator therebetween, where LMR and LTE transceivers 231 and 234 couple with isolator 210 at respective interface ports 221, 224, while first and second antennas 232, 233 couple with isolator 210 at respective interface ports 222, 223, said antennas being proximately located causing electromagnetic coupling therebetween as quantified in terms of a transmission RF scattering parameter that could be measured at interface ports 222, 223 of antenna block 269. Such electromagnetic coupling may occur, for example, during simultaneous transmission of LMR and LTE RF signals, simultaneous reception of LMR and LTE RF signals, simultaneous transmission of LMR RF signals and reception of LTE RF signals, and/or simultaneous transmission of LTE RF signals and reception of LMR RF signals.

Because isolator 210 incorporates RF coupler 140, said RF coupler generally providing means to route RF signals between each pair of interface ports 221, 222, 223, 224, it follows that both first and second antennas 232, 233 receive RF signals from each one of transceivers 231, 234, and both LMR and LTE transceivers 231, 234 receive RF signals from each one of antennas 232, 233. The RF coupler and the PCNs incorporated in isolator 210 determine the phasors of RF signals routed between transceivers and antennas while also providing high isolation between transceivers in the 7/800 MHz band. FIG. 2A further shows a number of suitable RF connection ports 266 to Global Core Accessory Interface (GCAI) connectors that can be engaged to port RF signals to optional radio accessories connected to the portable communication device 100. GCAI connectors are typically designed to port both LMR RF signals and analog and/or digital control or communication signals to optional portable LMR two-way radio external accessories, in order to enable special capabilities for LMR radio users (e.g. enabling a body-mounted audio and video camera accessory equipped with an LMR antenna). As described in the following, some embodiments advantageously enable porting either one or both LMR and LTE RF signals to an external accessory for portable two-way radios incorporating both LMR and LTE functionalities.

Figure 2B:
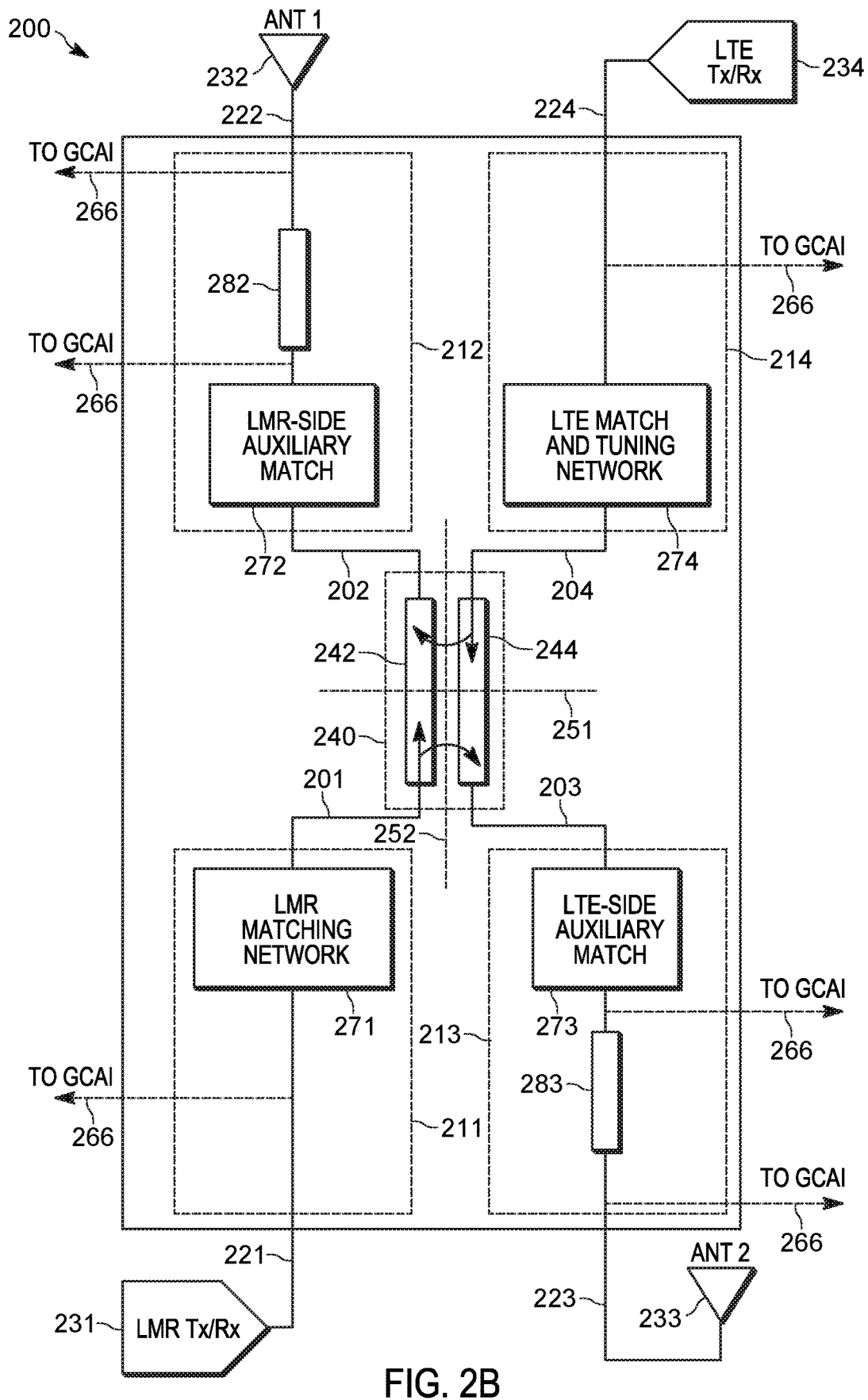
FIG. 2B is a more detailed block diagram of the antenna system in accordance with some embodiments.

FIG. 2B is a more detailed block diagram of an antenna system 200 for a portable wireless communication device in accordance with some embodiments, and will be used to illustrate the operational principle of isolator 210, as well as said RF connection ports 266 to a GCAI connector. PSNs 211 and 214 consist of a respective single PSC, the PSC 271 in PSN 211 being labeled "LMR matching network" and the PSC 274 in PSN 214 being labeled "LTE matching and tuning network" to reflect respective main design purposes. A passive lumped-element and/or distributed RF matching circuit is typically included in the RF signal chain between an LMR transceiver and an LMR antenna in two-way portable LMR radios in order to maximize the RF power transfer between antenna and transceiver, as well as attaining required levels of battery 142 current drain that meet battery life expectations (e.g. an 8-hour work shift). Since RF signals from/to LMR transceiver 231 in the 7/800 MHz band are routed to/from both first and second antennas 232, 233 through isolator 210, while preferably RF signals in the VHF and UHF bands are substantially only routed to/from first antenna 231 as explained in the foregoing, it may be advantageous effecting LMR matching functions closest to LMR transceiver 231, at PSC 271 within PSN 211, for all LMR operating bands. For analogous reasons, it may be advantageous effecting LTE matching functions closest to LTE transceiver 234, at PSC 274 within PSN 214, for all LTE operating bands.

Since LTE operating bands supported by antenna system 200 may jointly occupy much larger frequency spectrum swaths than the LMR 7/800 MHz band (e.g., covering all LTE bands between Band 12 and Band 5 involves the whole 699-894 MHz swath, about twice the 7/800 MHz LMR band range), good impedance match (i.e. low return loss) at interface port 224 leading to LTE transceiver 234 may not typically be achieved for all LTE operating bands concurrently, thus means to reconfigure PNC 274 in order to achieve good impedance match at any current LTE operating band may be frequently required. Said means typically involve the use of so-called "antenna tuners", a class of controller-operated dynamically reconfigurable RF components (e.g. tunable capacitors, switched RF signal routers, etc.), which enable dynamic control of the input impedance seen by LTE transceiver 234 at interface port 224. Placing "antenna tuners" or other RF components performing analogous functions within PSN 214 provides the further advantage that any residual LMR interfering signal impinging on PSN 214 would be already substantially attenuated by the isolating function performed by isolator 210, therefore "antenna tuners" and the likes are less bound to be subjected to large LMR interfering signal levels than, for instance, if said dynamic control functionality had been implemented within PSNs 212, 213, or if isolator 210 had not been employed at all. Excessive LMR interfering signal levels impinging on "antenna tuners" and the like may produce undesirable side effects, for instance generation of IM products, physical damage to RF components, to the LTE transceiver 234, and else.

PSN 212 features PSC 272, labeled "LMR-side auxiliary match", and RF transmission line 282, while PSN 213 features PSC 273, labeled "LTE-side auxiliary match", and RF transmission line 283. Neither PSCs 272 or 273 incorporate dynamically tunable components in this embodiment in order to limit said undesirable side effects that may occur if excessive LMR or LTE signal levels impinge on "antenna tuners" and the likes. This particular structure of PSNs 212, 213 advantageously provides an effective means to route either LTE or LMR signals, or both, to/from GCAI connectors, particularly when RF transmission lines 282 and 283 feature the typical system characteristic impedance, e.g. 50 ohm, chosen to realize GCAI-connector-hosted RF interfaces to auxiliary radio accessories since this various options, illustrated in FIG. 2B through dashed-line arrows, become available to locate one or more routing points for LMR and LTE signals to/from respective transceivers 231, 234 to GCAI connectors upon inserting RF switches (not shown) or other suitable RF signal routing means (e.g. RF signal splitters or RF diplexers, not shown). Said routing point location options, which include either end of RF transmission lines 282 and 283 within respective PSNs 212, 213 may be advantageous since desirably, by design, they would occur at low voltage standing-wave ratio (VSWR) locations within isolator 210. Additional low VSWR locations may be available within isolator 210, such as locations within PSNs 211, 214 proximate to respective interface ports 221, 224. When one or more RF connection ports 266 to GCAI connectors are implements within a PSN, the number of PSN ports increases correspondingly. For instance, PSN 211 in FIG. 2B is a three-port RF network.

Based on the foregoing, the underlying rationale for isolator 210 operation can be explained starting from a preliminary limiting assumption of a lossless RF coupler 240 comprising two length-wise uniformly coupled quarter-wavelength transmission lines 242, 244 designed to provide ideal isolation between RF coupler ports 201 and 204, and between RF coupler ports 202 and 203, said wavelength corresponding to a predefined RF coupler design frequency. The operation of such an RF coupler can be explained in terms of even and odd mode impedances, and that said ideal isolation is attained at all frequencies when the geometrical average of said impedances is equal to the chosen system characteristic impedance, e.g. 50 ohm, and all RF coupler ports are loaded with RF terminations (sources and/or loads) featuring said chosen system characteristic impedance. Such an RF coupler exhibits reflectional symmetries about mutually orthogonal planes to which co-planar centerlines 251 and 252 in FIG. 2B respectively belong and normal to the plane to which both center lines belong, therefore its operation can be summarized based on the routing analysis of an RF signal impinging on the RF coupler at RF coupler port 201, where there is no reflected RF signal at RF coupler port 201, a fractional portion of the impinging RF signal is routed to RF coupler port 202 with 90 degree phase delay and a complementary fractional portion of the impinging RF signal is routed to RF coupler port 203 with no phase delay, with no fractional portion of the RF signal routed to RF coupler port 204. Such a signal routing scheme is described graphically in FIG. 2B by means of straight and curved arrows across and between transmission lines 242 and 244, departing from RF coupler port 201 for the example just described, and departing from RF coupler port 204 for the case of an RF signal impinging on the RF coupler at RF coupler port 204. Assuming that both transceivers 231, 234 and both antennas 232, 233 presented respective frequency-independent input impedances equal to the system characteristic impedance, e.g. 50 ohm, and that RF coupling between antennas 232, 233 were vanishingly small as quantified in terms of a transmission RF scattering parameter that could be measured at interface ports 222, 223 of antenna block 269, then it would follow that, absent any RF signal reflections or attenuations introduced by PSNs 211, 212, 213, 214, RF coupling between transceivers 231, 234 would also be vanishingly small as quantified in terms of a transmission RF scattering parameter that could be measured at interface ports 221, 224 of isolator 210. This outcome is expected since RF couplers are devices that intrinsically perform RF signal cancellation in the RF circuitry domain under ideal loading conditions; therefore their use within isolator 210 is consequently expected to provide an enabling element to achieve, in conjunction with the other constituting elements of isolator 210, the overarching objective of mitigating mutual RF interference between LMR and LTE transceivers 231, 234 through interfering RF signal cancellation.

However, RF coupling between antennas 232, 233 is typically not small, representing in fact the undesirable effect to be mitigated by isolator 210, and the input impedance of antennas 232, 233 is not constant and equal to the chosen system characteristic impedance versus frequency. Thus, although it is possible to design antennas 232, 233 to simultaneously present a respective input impedance equal to the chosen system characteristic impedance at a predefined design frequency, the resulting RF coupling between transceivers 231, 234 would not in general be vanishingly small at said frequency due to RF coupling between antennas 232, 233. In fact, said RF coupling between antennas would produce, for instance, RF signal leakage from interface port 222 to interface port 223 via antenna block 269, thus to RF coupler port 203 (since PCN 213 is uninfluential as stipulated earlier), and consequently to RF coupler port 204 due to the aforementioned reflectional symmetry characteristics, and finally to interface port 224 leading to LTE transceiver 234 (since PCN 214 is also uninfluential as stipulated earlier). Therefore an LMR RF signal generated by LMR transceiver 231 impinging directly at RF coupler port 201 (since PCN 211 is also uninfluential) and routed to RF coupler port 202 as explained above, thus to interface port 222 (since PCN 212 is also uninfluential), has a viable RF signal path to LTE transceiver 234 even when both antennas 232, 233 present simultaneously an input impedance equal to the system characteristic impedance at a predefined design frequency, e.g. 790 MHz. Moreover, even when the residual RF coupling between transceivers 231, 234 may be at a level that could be acceptable at said design frequency, such a level can be typically maintained over a narrow frequency range due to typical frequency gradients of the antennas 232, 233 respective input impedances. Therefore, there are intrinsic limitations that stem from using a simplified implementation of isolator 210, comprising a classic RF coupler 240 as described above. Similar considerations would also apply and similar outcomes would be observed if a different implementation technology for RF coupler 240 were to be chosen, for instance choosing branch-line couplers, with the additional disadvantage that branch-line couplers would not let VHF and UHF signals travel substantially unperturbed between LMR transceiver 231 and first antenna 232.

Based on the foregoing explanation, it holds clear that superior performances, in terms of transceiver isolation level and isolation bandwidth under realistic scenarios, may be achieved only if additional elements besides an RF coupler 240 are incorporated in isolator 210, and if the constraints of the ideal RF coupler implementation outlined in the foregoing are removed. In particular, the addition of PSNs within isolator 210, providing broad flexibility in the design of the respective PSCs and RF transmission lines, paired with the removal of the otherwise typical constraints in the RF coupler parameters (e.g., the electrical length of coupled transmission line RF couplers, and the geometrical average of their even and odd mode impedances), as well as the incorporation of controller-operated active and passive components to make the RF coupler dynamically reconfigurable as illustrated in the following, represent key enablers for achieving superior RF interference cancellation performances over broader frequency bandwidths, as corroborated by the results in the 7/800 MHz band presented in the following, while also preserving the ability to support LMR transmission in the VHF and UHF bands, route LMR and LTE signals to/from GCAI connectors, end effect LTE dynamic tuning, thereby enabling simultaneous operation of the LMR and LTE transceivers 231, 234 in proximate, adjacent or overlapping frequency bands.

Based on the foregoing, the interfering RF signal cancellation may be now described in more details making once again reference to FIG. 1A, which provides the more general embodiment of isolator 110 illustrated therein. In the presence of isolator 110, there are three RF paths available for an interfering signal to reach the victim transceiver. Assuming the interfering RF signal is generated by LMR transceiver 131, it may reach LTE transceiver 134 through PSN 111, a straight coupling path to PSN 112 via RF coupler ports 101, 102, then to first antenna 131, reaching second antenna 133 via mutual antenna coupling, then PSN 113, reaching PSN 114 via the straight coupling path crossing RF coupler ports 103, 104, thus interface port 124 leading to LTE transceiver 134. A second RF interference path involves the coupling path between ports 101 and 103 of the RF coupler 140, then PSN 113 leading to second antenna 133, and first antenna 132 through mutual antenna coupling, followed by PSN 112 and coupling path between ports 102 and 104 of the RF coupler 140 to reach PSN 114 and then port 124 leading to LTE transceiver 134. A third RF interference path involves the coupling path between ports 101 and 104 of the RF coupler 140 and continues to PSN 114 and then port 124 leading to LTE transceiver 134. The interference path between ports 101 and 104 of the RF coupler 140 is viable when the RF coupler design departs from the classic one described in the foregoing and thus provides additional degrees of freedom that help achieving larger isolation bandwidths. The concurrent optimization of the parameters of RF coupler 140 and PSNs 111, 112, 113, 114 within isolator 110 leads to superior RF isolation and radiation efficiency performances. Because of reciprocal network nature of isolator 110, the same considerations apply for coupling paths of the signal transmitted from LTE transceiver 134 to LMR transceiver 131, resulting in RF interference cancellation at LMR transceiver 131.

Figure 3A:
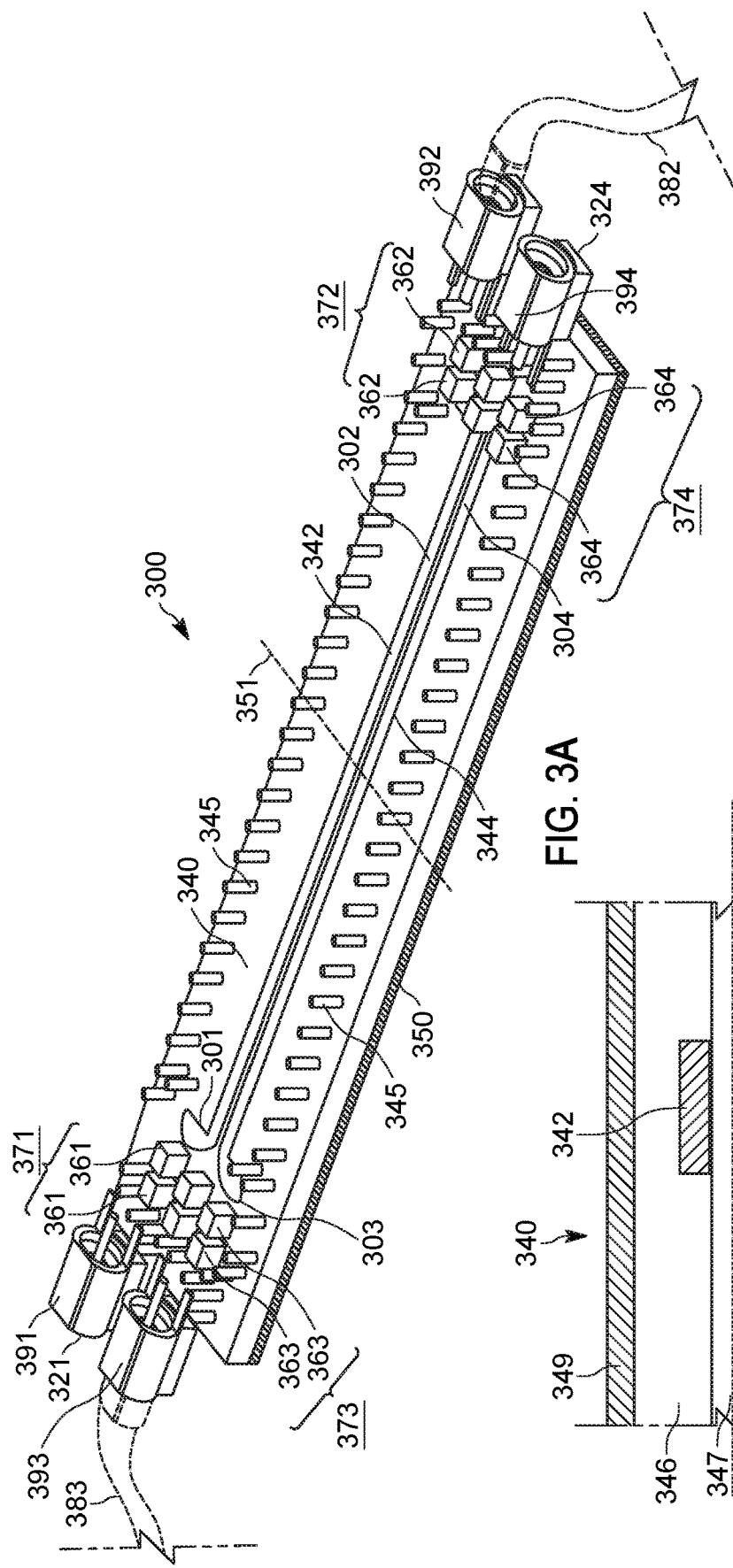
FIG. 3A is an example of a physical implementation of a physical RF coupler and phasor-shaping networks in accordance with some embodiments.
Figure 3B:
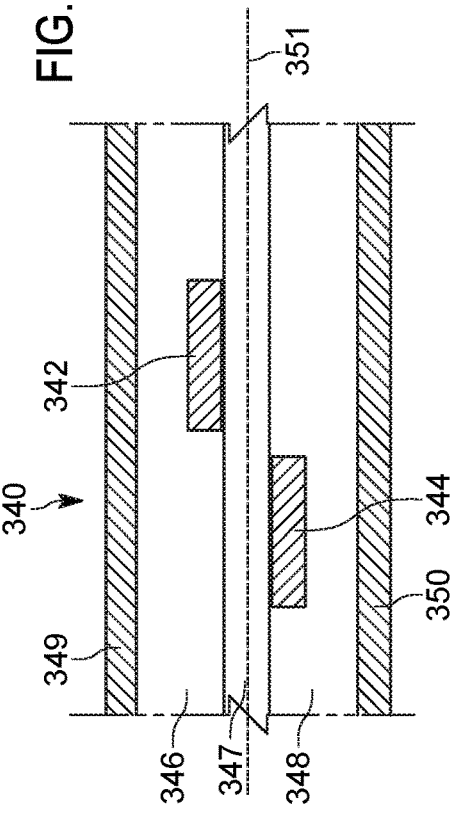
FIG. 3B is a transverse cross-sectional view of the physical implementation of FIG. 3A in accordance with some embodiments.

FIG. 3A is an example of a physical configuration for sub-assembly 300 of isolator 210 formed in accordance with some embodiments. FIG. 3B is a cut-away view of the sub-assembly of FIG. 3A in accordance with some embodiments. Sub-assembly 300 incorporates RF coupler 340 and PSCs 371, 372, 373, 374, providing a practical implementation of a discrete-component lumped-circuit embodiment for PSCs 271, 272, 273, 274 in FIG. 2B, and a practical implementation of RF coupler 240 in FIG. 2B consisting of a coupled transmission line embodiment featuring asymmetric striplines. RF transmission lines 282 and 283 respectively incorporated in PSNs 212, 213 within isolator 210 in FIG. 2B are physically realized as connectorized coaxial cables 382 and 383, which are electrically connected to sub-assembly 300 at snap-in connector receptacles 392 and 393, while snap-in connector receptacles 391, 394 respectively locate interface port 321 leading to LMR transceiver 231 and interface port 324 leading to LTE transceiver 234. RF coupler 340 comprises parallel asymmetric striplines 342, 344 terminating at respective ports 301, 302, and 303, 304, and exhibits a reflectional symmetry about a cross-sectional plane (not shown) normal to the striplines and containing centerline 351. The cut-away view in FIG. 3B lies on said cross-sectional plane containing centerline 351, and illustrates the cross-sectional characteristics of coupled striplines 342, 344, wherein three layers 346, 347, 348 of low-loss PCB dielectric material sandwich said striplines, and two layers 349, 350 of low-loss PCB metallic material provide the required stripline ground-return current paths at the outermost top and bottom surfaces, respectively, of RF coupler 340. Dielectric layers 346 and 348 are made of the same material and have identical thicknesses, while the middle layer 347 may or may not be a different material and may or may not have different thickness. Although not a strict requirement, metallic layers 349, 340 may be made out of the same material and have identical thicknesses. Striplines 342, 344 are also made out of low-loss PCB metallic material and may or may not feature the same thickness and width. All the aforementioned materials and associated physical dimensions are determined in order to achieve desirable even and odd characteristic impedances and physical dimensions within the allowable manufacturing constraints for RF coupler 340. Therefore it is clear now that, for the purposes of description, only PCB layers 348, 350 are visible in FIG. 3A, the remaining PCB layers having been omitted to make visible the striplines 342, 344, as well as the array of metallic vias 345 connecting PCB layers 349, 350 around the perimeter of RF coupler 340 and sub-assembly 300 in order to provide the required ground references for said striplines and said PSCs, and to avoid the onset of propagating parallel-plate modes that could generate unwanted crosstalk and radiated emissions. The PSCs 371, 372, 373, 374 are realized on the same PCB hosting RF coupler 340 in order for sub-assembly 300 to be physically compact, said PSCs featuring respective surface-mount lumped RF components generally indicated with the same numerals 361, 362, 363, 364 for each PSC, with suitable conductive interconnections (not shown) between RF component mounting pads, between pads and PCB ground layers, between pads and PCB ground and the corresponding soldering features of snap-in connector receptacles 391, 392, 393, 394. The number, type, and interconnecting topology of RF components 361, 362, 363, 364 are all optimized in order to achieve the desired performances for antenna system 200, e.g. in terms of radiation efficiencies and isolation between transceivers, as well as to meet other associated goals, e.g. cost, size, weight.

The foregoing description provides an example of the physical realization of a fixed-coupling RF coupler 340, where the RF scattering parameters at the RF coupler ports 301, 302, 303, 304 cannot be altered during actual operation of said RF coupler, even though, as previously discussed, any of the PSCs in sub-assembly 300 may include active or passive, controller-operated dynamically reconfigurable RF components. Given a set of performance goals for antenna system 200, RF coupler 340 may be designed and optimized for a certain set of RF scattering parameters measured or otherwise estimated at interface ports 222, 223 of antenna block 269. Because of the radio user proximity to and handling of portable wireless communication device 100, the RF scattering parameters of said set of RF scattering parameters may change significantly depending on the situation of use of device 100. For instance, the RF scattering parameters measured at interface ports 222, 223 when the radio is hand held close to the user's face may differ significantly from the RF scattering parameters measured at interface ports 222, 223 when the radio is carried in a holster attached to the user's belt, and may further differ when the radio is placed on a desk. Due to this situational variability, the performances of antenna system 200 may degrade in situations of use that differ from the one for which the RF coupler 340 parameters were optimized.

Figure 4A:
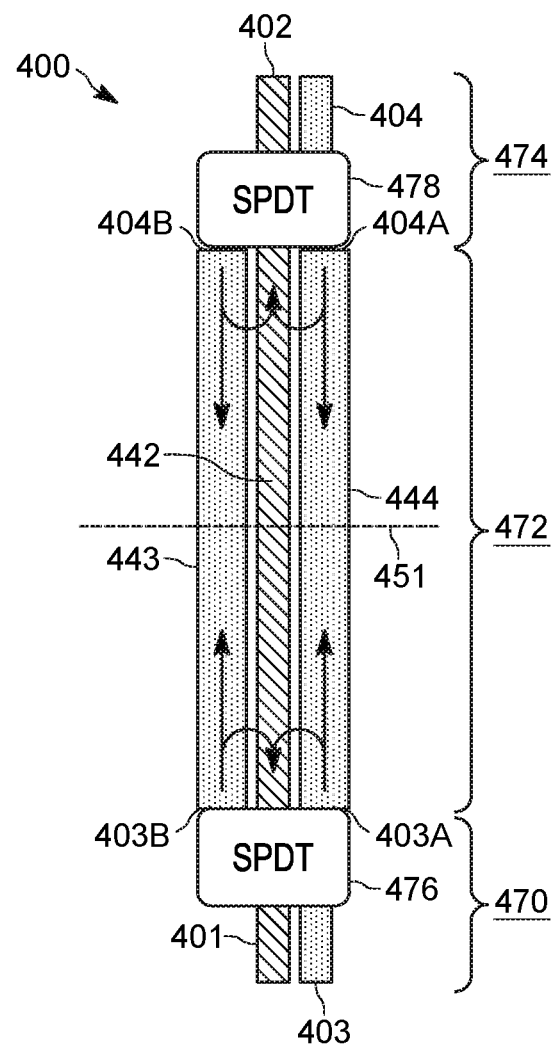
FIG. 4A is a schematic depiction of a reconfigurable RF coupler comprising coupled transmission lines in accordance with some embodiments.

To negate such a drawback, it is advantageous to provide RF coupler 140 with multiple controller-operated and dynamically effected operating states. Such a reconfigurable RF coupler can be realized, for example, as schematically illustrated in FIG. 4A, where the basic elements and operation of reconfigurable RF coupler 400 according to the embodiments are provided. Reconfigurable RF coupler 400 can be subdivided into three cascaded sections, a reconfiguring section 470, a coupling section 472, and a reconfiguring section 474, where said reconfiguring sections feature respective controller-operated Single Pole Double Throw (SPDT) RF switches 476, 478. The coupling section 472 features three coupled transmission lines 442, 443, and 444, where typically the coupling between transmission lines 442, 444 and the coupling between transmission lines 442, 443 is substantially stronger than the coupling between transmission lines 443, 444, where said couplings are conventionally determined from the capacitive and inductive mutual couplings amongst said coupled transmission lines corresponding to predefined operating conditions (e.g. the available states of RF switches 476, 478). Transmission line 442 does not couple with either RF switch 476 or RF switch 478 and features RF coupler ports 401, 402 at opposite ends. The single pole of RF switch 476 couples to RF coupler port 403, while the single pole of RF switch 478 couples to RF coupler port 404. The first and second throws of RF switch 476 couple respectively to transmission line 444 at interface port 403A and to transmission line 443 at interface port 403B, while the first and second throws of RF switch 478 couple respectively to transmission line 444 at interface port 404A and to transmission line 443 at interface port 404B. The transmission line sections extending from either RF switch to RF coupler ports 401, 402, 403, 404 are for the purposes of description and are devoid of physical attributes such as length or materials and only serve to illustrate RF signal pathways in embodiments of the invention.

RF switches 476, 478 are operated synchronously by controller 150 to provide two operating states, a state "A" where RF switch 476 couples RF coupler port 403 and interface port 403A while RF switch 478 couples RF coupler port 404 and interface port 404A, and a state "B" where RF switch 476 couples RF coupler port 403 and interface port 403B while RF switch 478 couples RF coupler port 404 and interface port 404B. Therefore, when controller 150 concurrently sets RF switches 476, 478 in state "A" the transmission lines 442, 444 form an RF coupler with a first set of coupling parameters, whereby an RF signal impinging on RF coupler port 403 or RF coupler port 404 would be routed to RF coupler ports 401, 402 by virtue of the coupling between said transmission lines, while transmission line 443 only contributes, to a minor extent, to the coupling between transmission lines 442, 444 due to mutual capacitive and inductive coupling with them. Conversely, when controller 150 concurrently sets RF switches 476, 478 in state "B" the transmission lines 442, 443 form an RF coupler with a second set of coupling parameters, whereby an RF signal impinging on RF coupler port 403 or RF coupler port 404 would be routed to RF coupler ports 401, 402 by virtue of the coupling between said transmission lines, while transmission line 444 only contributes, to a minor extent, to the coupling between transmission lines 442, 443 due to mutual capacitive and inductive coupling with them. RF signal flow arrows are provided in FIG. 4A to visualize the operation of reconfigurable RF coupler 400 according to the foregoing explanation.

Therefore, a reconfigurable RF coupler 400 is provided, which exhibits two different sets of coupling parameters influencing the phasors of RF signals routed among reconfigurable RF coupler ports 401, 402, 403, 404, depending on the controller-operated synchronous state ("A" or "B") of RF switches 476, 478, thus isolator 210 is correspondingly configured by controller 150 in analogous "A" or "B" states, which may be respectively optimized for distinct situations of use of portable wireless communication device 100 (e.g., hand-held and body-mounted). For instance, any reconfigurable RF components in any of PSNs 211, 212, 213, 214 may be concurrently set by controller 150 in "A" or "B" states synchronously with the controller-operated state of reconfigurable RF coupler 400. Controller-operated configuration of RF switches 476, 478 may be dynamically effected in response to one or more of various factors including but not limited to band of operation, currently engaged communication protocol, device-hosted sensor information, user input, LTE or LMR infrastructure network inputs, type and state of device accessories engaged, and more.

Clearly, a reconfigurable RF coupler with more than two states can be realized by increasing the number of coupled transmission lines in coupling section 472 and using RF switches with a correspondingly larger number of throws, and even engaging more than two coupled transmission lines in coupling section 472 concurrently by operating multiple RF switch throws concurrently (e.g., establishing a new state "C" in reconfigurable RF coupler 400 upon enabling both throws of RF switches 476 and 478 to simultaneously couple respective RF coupler ports 403, 404 with coupled transmission lines 443, 444 concurrently.)

Figure 4B:
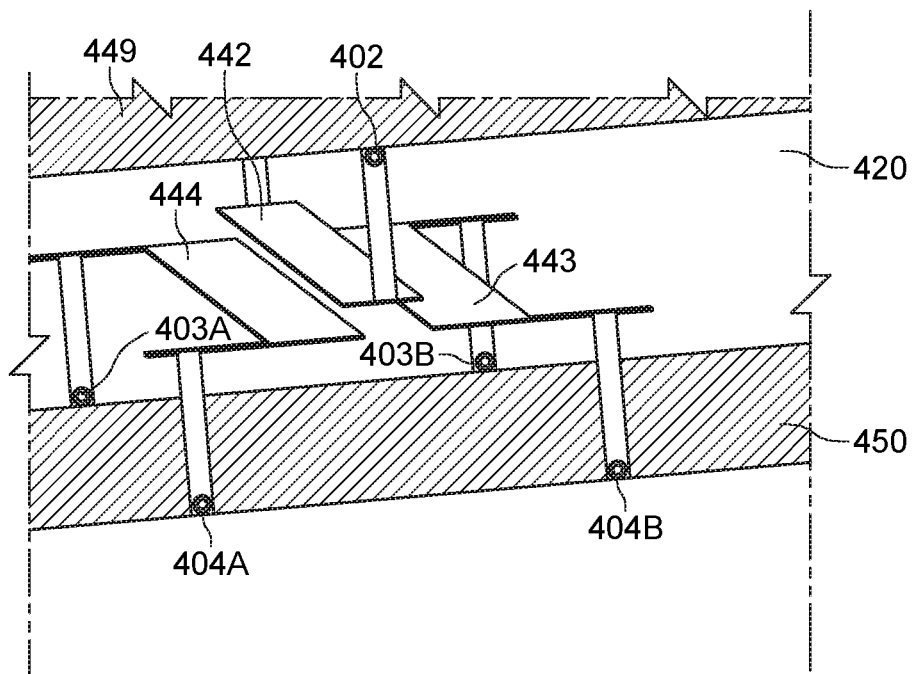
FIG. 4B is in isometric diagram representation of a physical realization of the reconfigurable RF coupler in FIG. 4A in accordance with some embodiments.
Figure 4C:
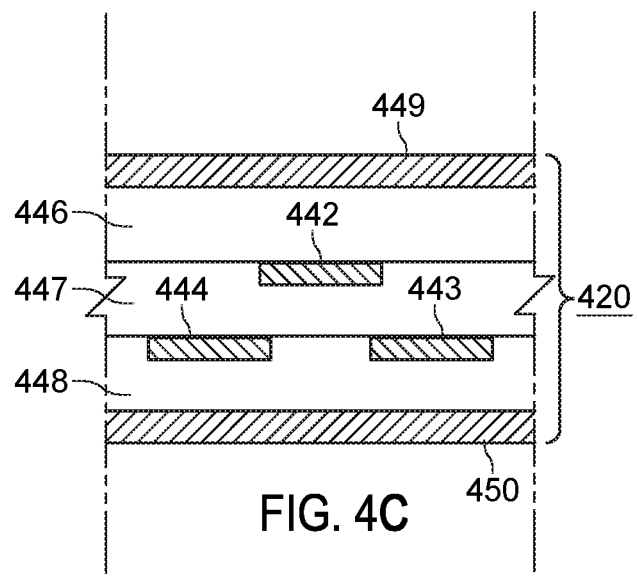
FIG. 4C is a transverse cross-sectional view of the reconfigurable RF coupler in FIG. 4B in accordance with some embodiments.

FIG. 4B is in isometric diagram representation of the coupling section 472 of reconfigurable RF coupler 400 of FIG. 4A in accordance with some embodiments. Multi-layer substrate 420 comprises first, second, and third coupled transmission lines 442, 443, 444 realized as asymmetric striplines, according to the substrate layering scheme described in FIG. 4C, which is a cut-away view of the coupling section 472 of reconfigurable RF coupler 400 in FIG. 4B in accordance with some embodiments. Similar considerations apply as for the layering scheme described in FIG. 3B, where low-loss PCB dielectric material layers 446 and 448 are made of the same material and have identical thicknesses, while the middle layer 447 may or may not be a different material and may or may not have different thickness, low-loss ground metallic layers 449, 450 are typically made out of the same material and have identical thicknesses, striplines 442, 443, 444 are made out of low-loss PCB metallic material and may or may not feature the same thickness and width, as well as lateral displacements among each other, and all the aforementioned materials and associated physical dimensions are determined in order to achieve desirable transmission line couplings and other physical characteristics within the allowable manufacturing constraints.

The conductive via connections required between ground metallic layers 449, 450 at the periphery of coupling section 472 are not shown. The asymmetric striplines in FIG. 4B feature conductive via connections at their extremities that lead to respective RF ports proximate to either ground metallic layer 449 for RF coupler ports 301 (not visible in FIG. 4B) and 402, or ground metallic layer 450 for interface ports 403A, 403B, 404A, 404B.

Figure 5:
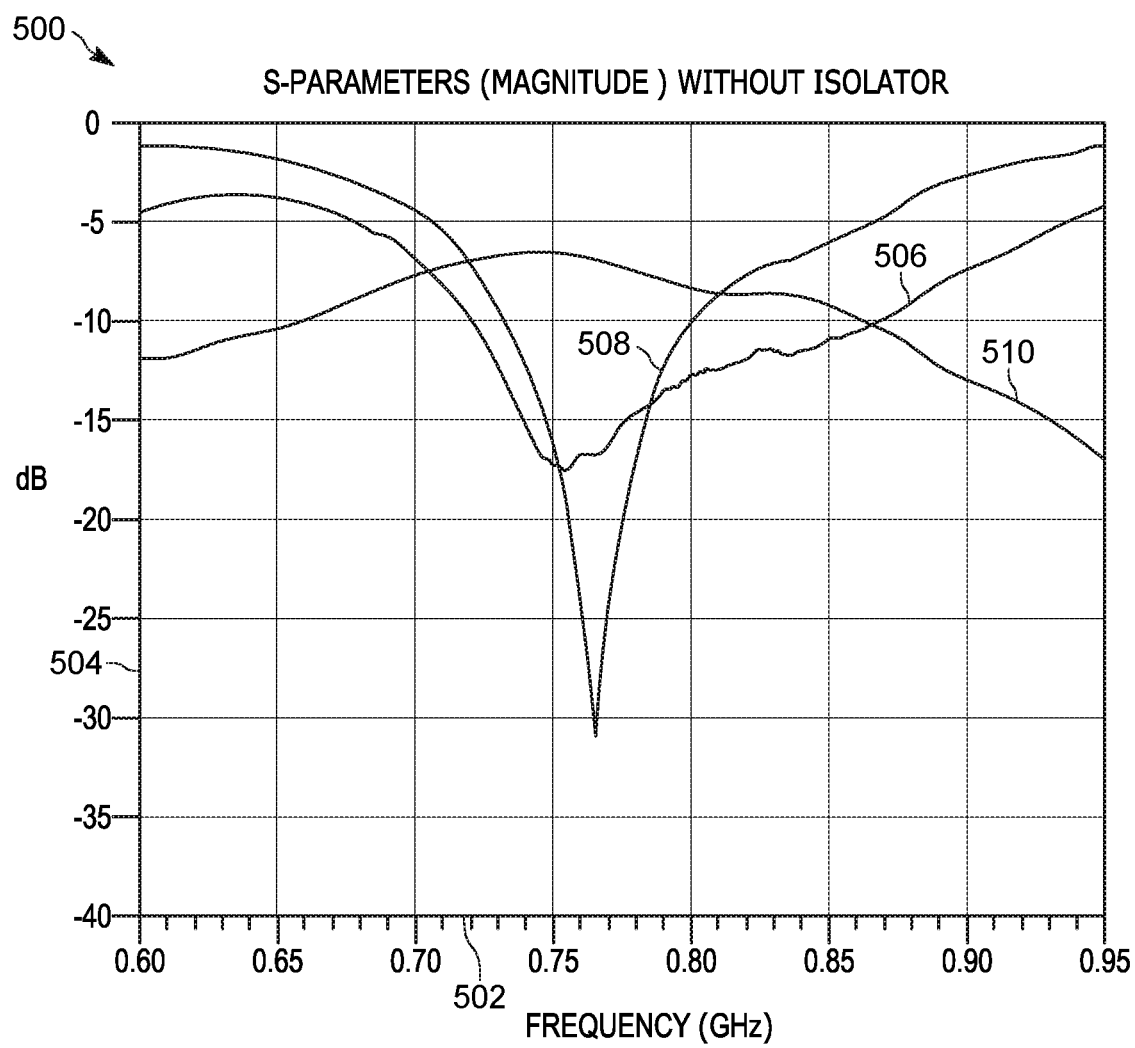
FIG. 5 is an example of a graph comparing RF scattering parameter performance (return loss and mutual coupling) of the antennas in FIG. 2A.

FIG. 5 is an example of a graph 500 illustrating measured RF scattering-parameter performance (antenna return loss and mutual coupling) for physical realizations of the antennas in antenna block 269, in the absence of isolator 110 of the embodiments. All RF scattering parameters shown in this figure and the following ones are relative to 50 ohm nominal port impedances. For this graph, a quarter-wavelength monopole LMR antenna was operated at 800 MHz atop a two-way LMR radio chassis featuring approximate vertical, lateral, and depth dimensions of 140 mm×55 mm×35 mm, while a Planar Inverted F-Antenna (PIFA) antenna was operated as an LTE antenna embedded within the chassis near the bottom of the radio, in an arrangement substantially analogous to that of first and second antennas 132,133 in FIG. 1A, respectively. Frequency (in GHz) is shown along a horizontal abscissa axis 502, and measured return loss and coupling (in dB) are shown along a vertical ordinate axis 504. Curve 506 represents the measured return loss frequency behavior for said LMR antenna, while curve 508 represents the measured return loss frequency behavior for said LTE antenna. Curve 510 represents the measured frequency behavior of the mutual coupling between the two antennas. Curve 510 indicates the occurrence of poor isolation (about 6.5 dB at a minimum) between LMR and LTE antennas in adjacent and overlapping frequency bands in the range from 746 to 894 MHz, said isolation being the opposite of the mutual coupling figure in dB terms. As will be shown in subsequent graphs, this poor isolation (caused by strong mutual coupling between antennas) can be improved substantially via the use of isolator 110 provided by the previously described embodiments.

Figure 6A:
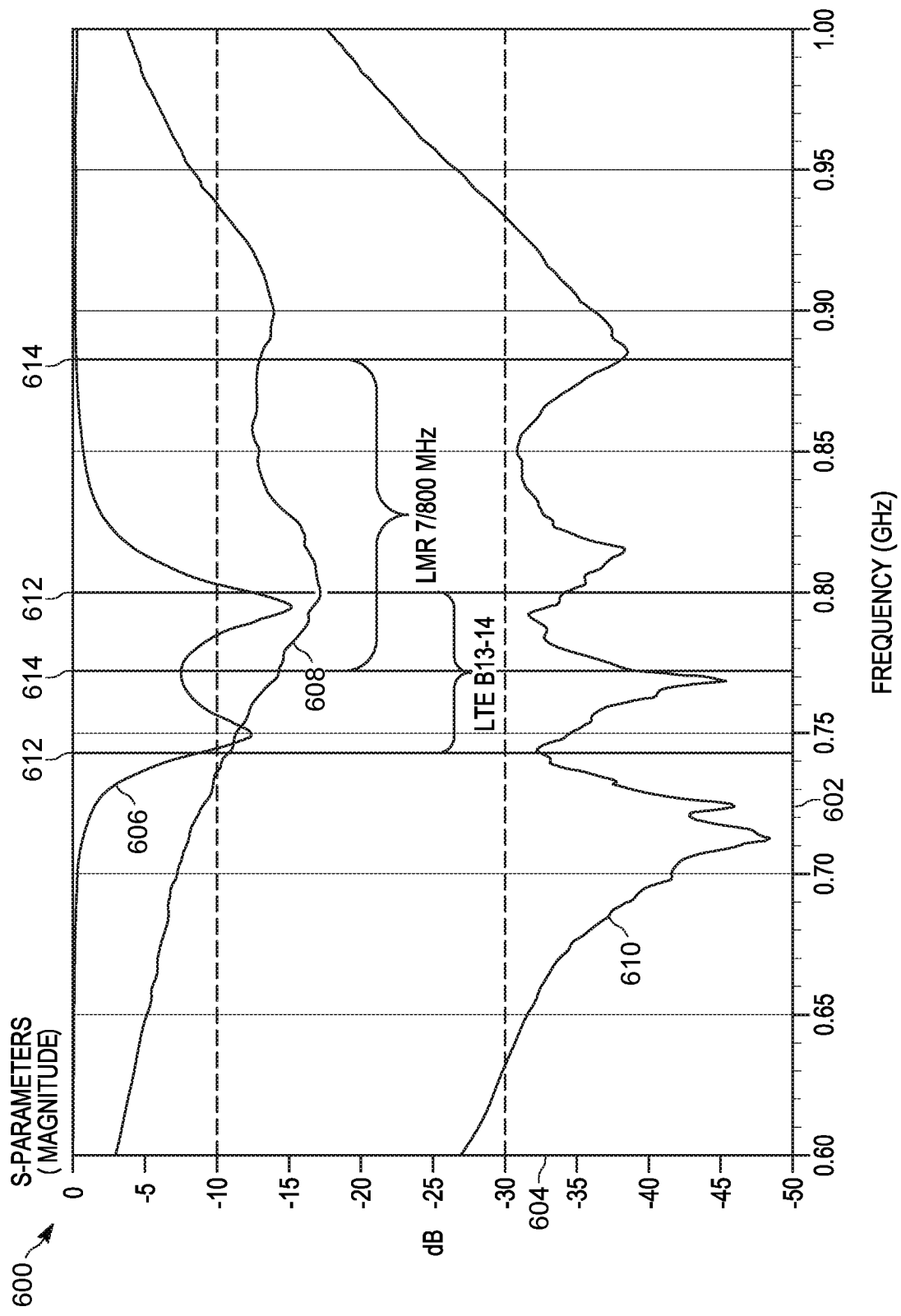
FIG. 6A is an example graph illustrating RF scattering parameter performance at the transceiver ports in FIG. 1A, with the isolator and antennas configured to operate in a first overlapping frequency range of concurrent operation in accordance with some embodiments.

FIG. 6A is an example of a graph 600 illustrating RF scattering-parameter performance with isolator 110 configured for a first overlapping frequency band formed in accordance with some embodiments. Graph 600 shows frequency (in GHz) along a horizontal abscissa axis 602, and antenna return loss and mutual coupling (in dB) along a vertical ordinate axis 604. A first overlapping frequency band of interest is indicated by designators 612 at the edges of joint LTE Band 13-14 (746-798 MHz), which overlaps with the LMR 7/800 MHz public safety band (764-869 MHz) whose edges are indicated by designators 614. Data curve 608 shows the corresponding return loss at interface port 121 as seen from LMR transceiver 131 in FIG. 1A. Data curve 606 shows the corresponding return loss at interface port 124 as seen from LTE transceiver 134 in FIG. 1A. Curve 610 shows the corresponding mutual coupling between LMR and LTE transceivers 131, 134, as seen at respective interface ports 121, 124 in FIG. 1A. It can be appreciated that said return losses substantially indicate that both transceivers operate in a desirable condition of impedance matching, the design target being a 10 dB return loss across the respective operating bands (as shown by a first horizontal dotted line), at the respective interface ports with isolator 110, while their resulting isolation is substantially improved relative to FIG. 5 and substantially better than the 30 dB design target (as shown by a second horizontal dotted line) across the overlapping frequency band. Hence, an isolator formed and operating in accordance with some of the embodiments advantageously provides improved, high isolation between the LMR and LTE transceivers in a first overlapping frequency band of interest.

Figure 6B:
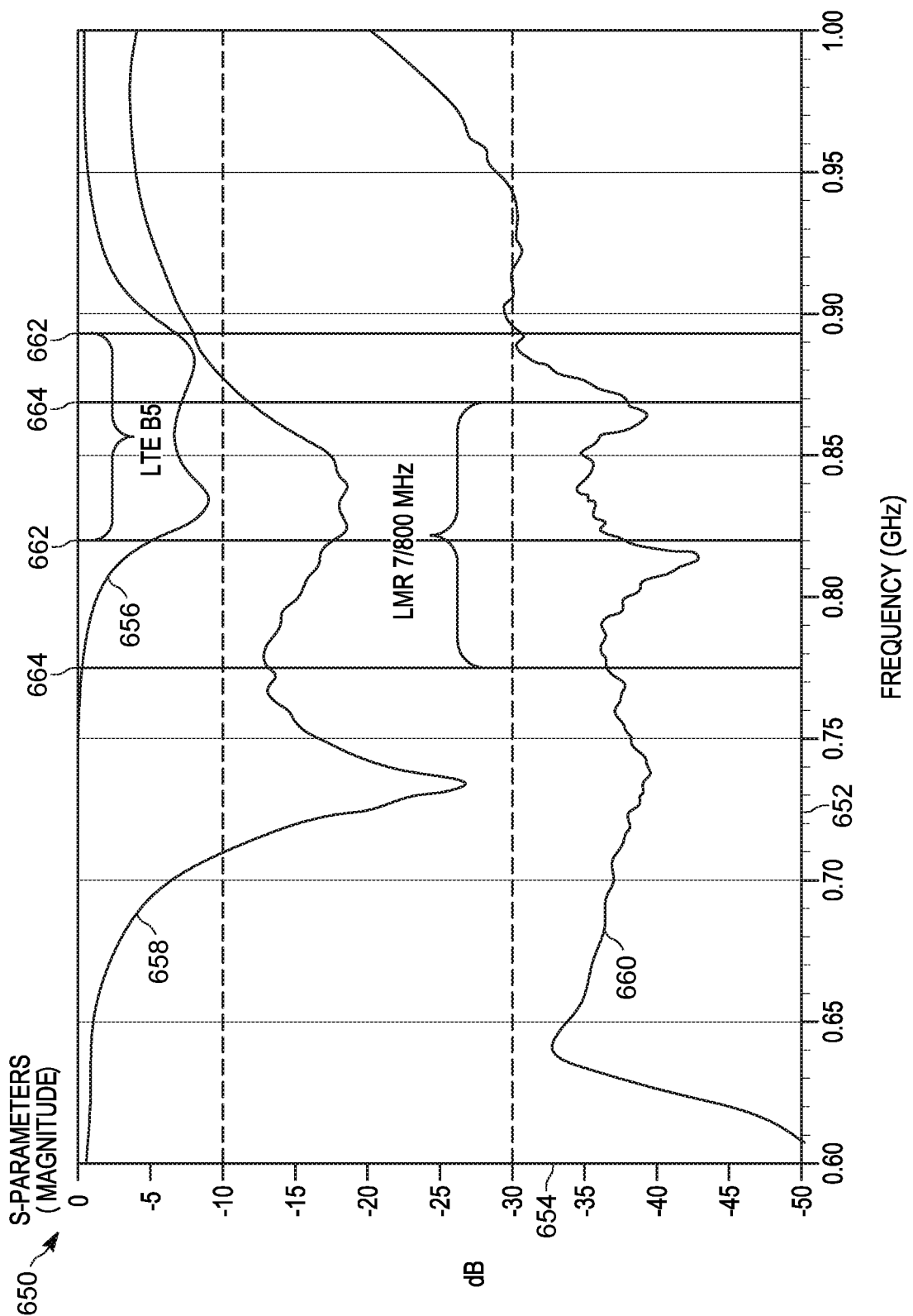
FIG. 6B is another example graph illustrating RF scattering parameter performance at the transceiver ports in FIG. 1A, with the isolator and antennas configured to operate in a second overlapping frequency range of concurrent operation in accordance with some embodiments.

The LTE transceiver may be operated in other LTE bands besides Bands 13 and 14, for example Band 5, Band 12 and other LTE frequency bands of interest which may be proximate to, adjacent to, or overlapping with the LMR 7/800 MHz band. Correspondingly, in accordance with the embodiments, isolator 110 can be configured via RF coupler 140 and PSNs 111, 112, 113, 114 to adjust accordingly for desirably high isolation between LMR and LTE transceivers 131, 134. Accordingly, FIG. 6B is an example of a graph 650 illustrating return loss and mutual coupling frequency behaviors with isolator 110 configured for a second overlapping frequency band of operation in accordance with some embodiments. Graph 650 shows frequency (in GHz) along a horizontal abscissa axis 652, and return loss and mutual coupling (in dB) along a vertical ordinate axis 654. A frequency band of interest is indicated by designators 662 as LTE Band 5 which overlaps with the LMR 7/800 MHz public safety band whose edges are indicated by designators 664. Data curve 658 shows the corresponding return loss at interface port 121 as seen from LMR transceiver 131 in FIG. 1A. Data curve 656 shows the corresponding return loss at interface port 124 as seen from LTE transceiver 134 in FIG. 1A. Curve 660 shows the corresponding mutual coupling between LMR and LTE transceivers 131, 134, as seen at respective interface ports 121, 124 in FIG. 1A. Said return losses indicate that both transceivers operate in an approximately desirable condition of impedance matching, the design target being a 10 dB return loss across the respective operating bands (as shown by a first horizontal dotted line), at the respective interface ports with isolator 110, while their resulting isolation is substantially improved relative to FIG. 5 and substantially better than the 30 dB design target (as shown by a second horizontal dotted line) across the overlapping frequency band. Hence, an isolator formed and operating in accordance with some of the embodiments is reconfigurable to advantageously provide high isolation between the LMR and LTE transceivers, across another overlapping LMR and LTE bands.

The isolator can also be optimized for other proximate, adjacent, or overlapping frequency bands of interest, such as those involving LTE Band 12, LTE Band 18, and LTE Band 20 to name a few. Thus one radio having the isolator incorporated therein is reconfigurable via the constituting elements of RF coupler 140 and PSNs 111, 112, 113, 114, thereby allowing a single radio to provide for well isolated, unconstrained, simultaneous LMR operation and LTE operation, even when the two antennas of said radio are substantially electromagnetically coupled due to space and other constraints.

The use of isolator 110 may provide additional performance benefits as further illustrated in the following FIGS. 7A and 7B, which are example polar-coordinate graphs comparing computer simulated far-field LMR gain patterns in a situation of use involving body-mounted radio operation, without the isolator and with the isolator of the embodiments, respectively. Graph 7A shows the silhouette of a radio user wearing the portable wireless communication device 100 at belt height, and a linear-scale LMR radiation pattern plot 700 in a vertical elevation plane in which an LMR elevation pattern gain distribution 702 is produced by first antenna 132, said antenna being about a quarter-wavelength long at 790 MHz, when it is fed with an LMR RF signal (modulated at 790 MHz) directly by the LMR transceiver 131 in the absence of isolator 110, said pattern being plotted in a specific azimuth plane corresponding to an angle Phi equal to 135 degrees across all Theta elevation angles expressed in degrees about the circular frame 712 enclosing said distribution. The linear magnitude of elevation pattern gain distribution 702 is reported in radial axis 714. As seen by graph 700 there is significant down-tilt of the gain distribution 702 with respect to the horizon (horizontal, or "azimuth", plane corresponding to Theta equal to 90 and −90 degrees). Such a gain distribution down-tilt is representative of the gain distribution in other elevation planes (Phi angles) and affects portable wireless communication device 100 performances negatively, by limiting the attainable gain in Theta directions 706 about said azimuth plane substantially, said directions constituting the most useful RF propagation directions for communicating wirelessly with other radio users or with communication towers, while dissipating most emitted RF signal energy in the terrain about Theta direction 704 where said gain distribution exhibits a maximum. Gain distribution down-tilt is typically observed for a top-mounted quarter-wavelength antenna employed for two-way radios in the 7/800 MHz LMR band and is due to the geometrical imbalance between said antenna and the radio ground structures functioning as the antenna electrical counterpoise. Thus the results provided in FIG. 7A, illustrating about 2 dB lower gain, in directions about the azimuth plane, than the peak gain in direction 704, are expected.

Figure 7A:
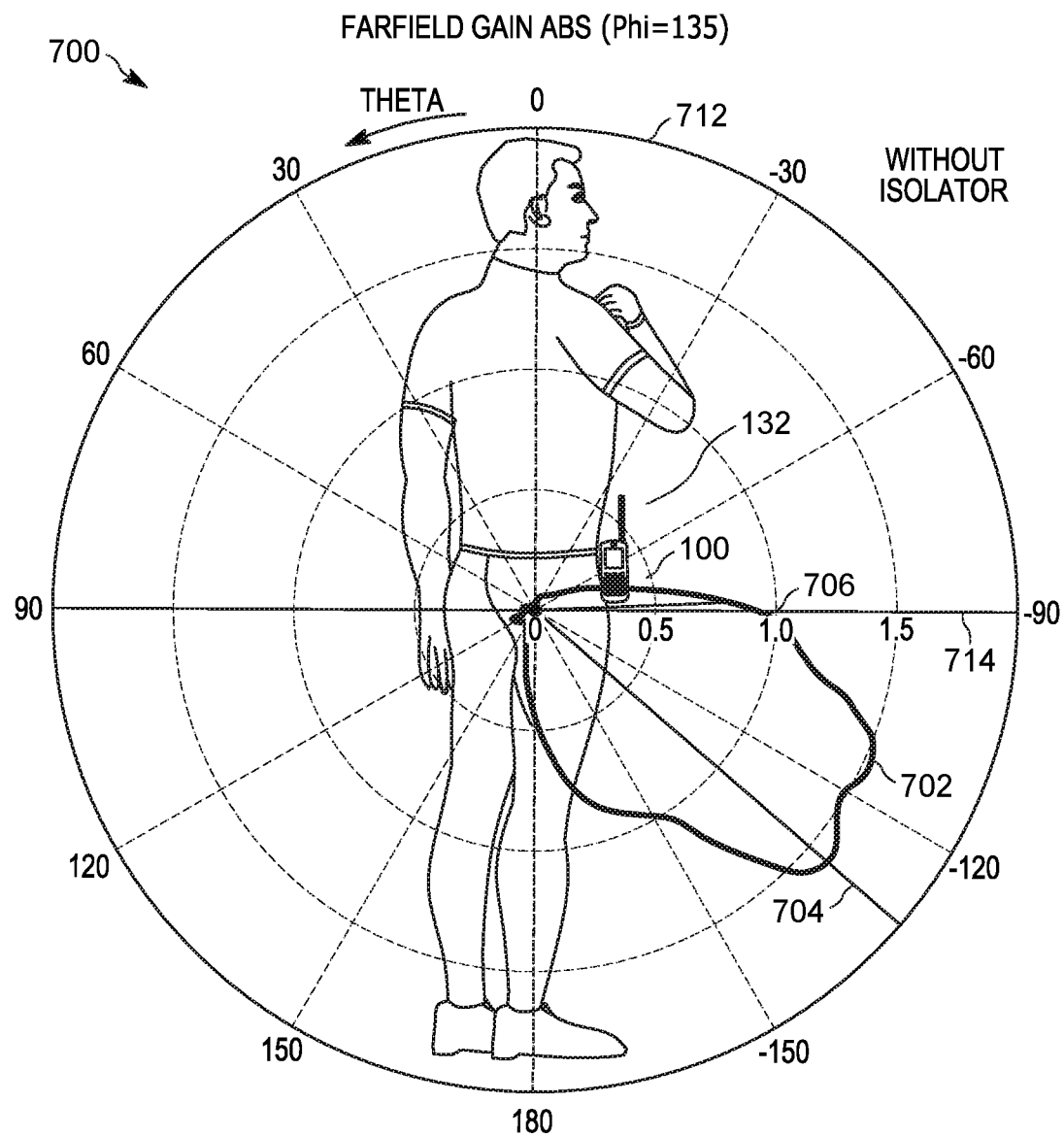
FIGS. 7A and 7B are example graphs comparing far-field gain performances, respectively without the RF isolator and with the RF isolator, in accordance with some embodiments.
Figure 7B:
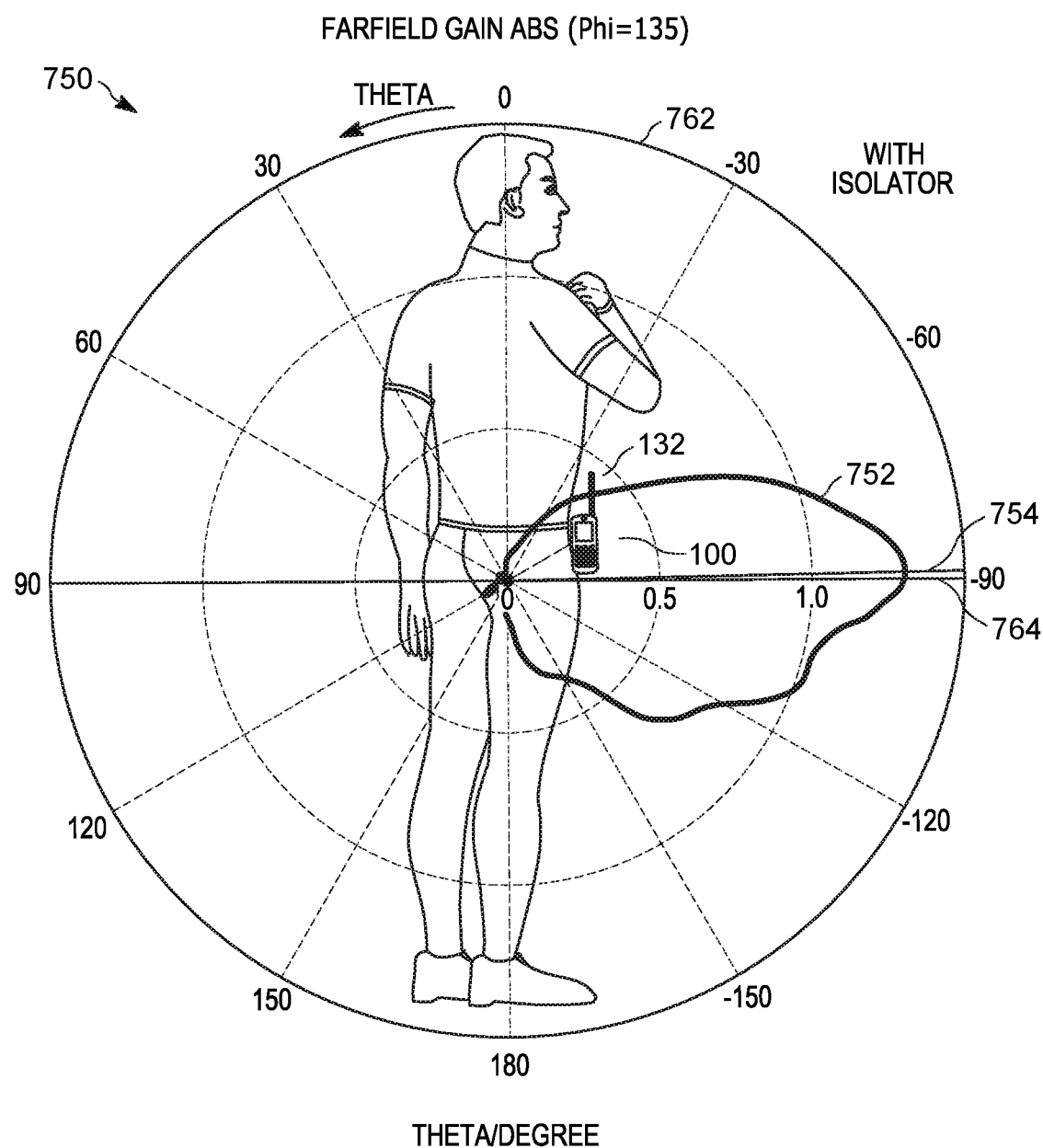

Referring now to graph 750 of FIG. 7B, featuring analogous polar reference frame as FIG. 7A (Phi equal to 135 degrees, the Theta elevation angles expressed in degrees about the circular frame 762, the linear magnitude of elevation pattern gain in radial axis 764), an isolator 110 of the embodiments is incorporated into portable wireless communication device 100, in the situation of use already illustrated in FIG. 7A, to allow an LMR signal generated by LMR transceiver 131 to be radiated coherently by both the first and second antennas 132, 133, while simultaneously substantially reducing the mutual coupling with LTE transceiver 134 according to the embodiments. Because the LMR and LTE transceivers 131, 134 transmit uncorrelated waveforms, the following considerations apply regardless of whether the LTE transceiver is operating concurrently with the LMR transceiver. LMR elevation pattern gain distribution 752 shows an improved performance relative to LMR elevation pattern gain distribution 702 since the former distribution exhibits peak gain corresponding to direction 754, which is about the azimuth plane, thus about directions considered advantageous to communication in an LMR system.

Figure 8:
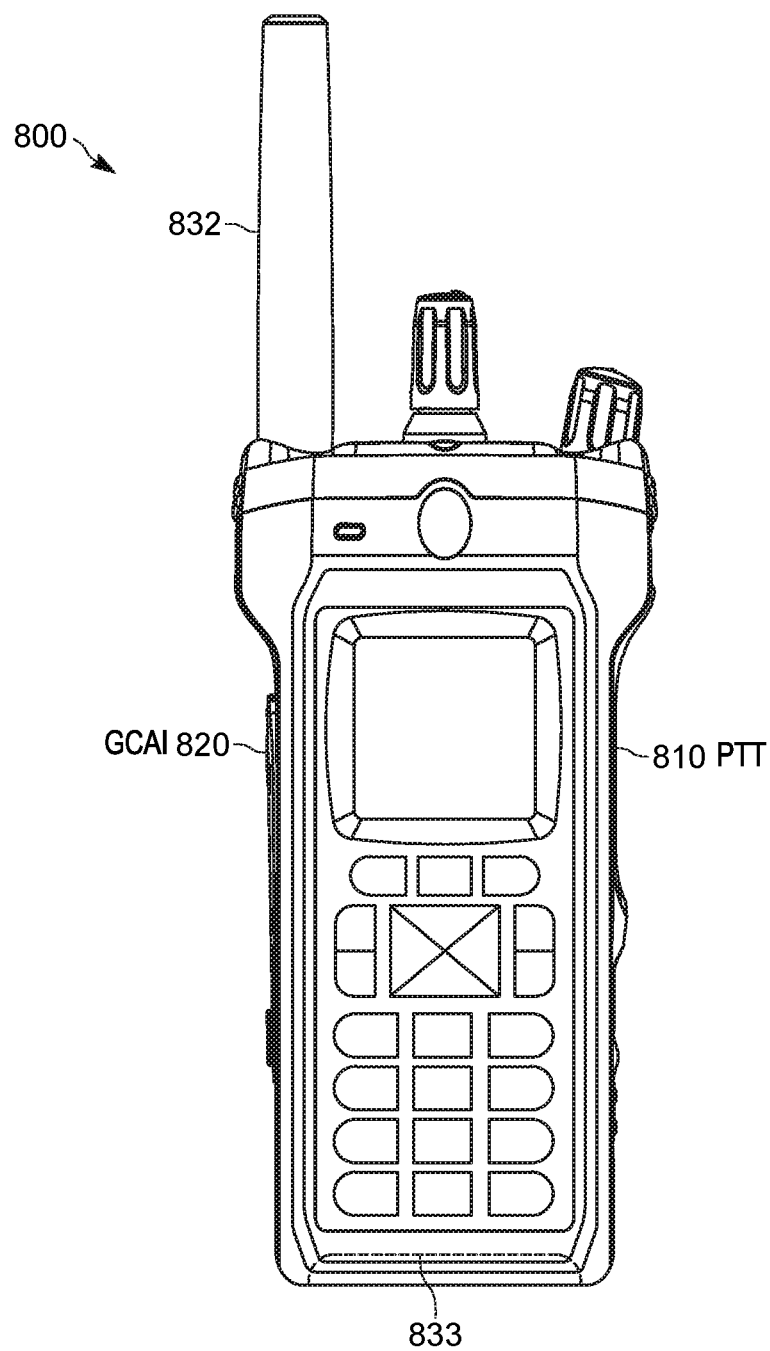
FIG. 8 is a portable radio incorporating the antenna system formed in accordance with some embodiments.

FIG. 8 is a portable radio 800 incorporating the antenna system formed in accordance with some embodiments. FIG. 8 provides for a battery operated portable communication device, such as a portable radio, comprising a controller, a LTE transceiver coupled to the controller, a LMR transceiver coupled to the controller, an isolator interfacing the LMR transceiver and the LTE transceiver in the manner previously described. The first antenna 832 is located externally on a top surface of the portable radio, while the second antenna 833 is located internally within a bottom portion of the portable radio. External antenna 832 and internal antenna 833 interface an isolator in the manner previously described. External antenna 832 operates with internal antenna 833, as well as said isolator, to provide LMR operation across one or multiple LMR bands such as VHF, UHF, 7/800 MHz, and LTE operation across one or multiple LTE bands such as Bands 5, 12, 13, 14, 18, 20, wherein some of the LTE bands will be proximate to, adjacent to, or overlapping with one or more LMR bands. Either the LMR transceiver or the LTE transceiver, or both, may be operated to transmit when a push-to-talk (PTT) button 810 is depressed by the radio user. Either the LMR transceiver or the LTE transceiver, or both, may be coupled to a global communication accessory interface (GCAI) connector 820.

Accordingly, there has been provided is an antenna system for a portable wireless communication device in which at least two antennas and at least two transceivers (e.g. LMR transceiver and LTE transceiver) are provided with improved isolation between said transmitters and with improved radiation patterns. The antenna system facilitates the ability to enable, for example, LMR/LTE converged devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An antenna system for a portable wireless communication device, comprising:
    a first antenna;
    a second antenna,
    the first and second antennas being proximally located causing electromagnetic coupling therebetween;
    a first RF transceiver;
    a second RF transceiver;
    an isolator coupled with said first and second antennas and said first and second RF transceivers at respective interface ports, said isolator comprising:
        a radio frequency (RF) coupler featuring four RF coupler ports forming two pairs of RF coupler ports, each pair residing at opposite ends of the RF coupler;
        a pair of coupled RF transmission lines connected between each pair of RF coupler ports;
    the first RF transceiver being connected to a first end of a first coupled RF transmission line at a first RF coupler port of the first pair of RF ports;
    the first antenna being connected to a second end of the first coupled RF transmission line at a first RF coupler port of the second pair of RF ports;
    the second RF transceiver being connected to a second end of the second coupled RF transmission line at a second RF coupler port of the second pair of RF ports;
    the second antenna being connected to a first end of the second coupled RF transmission line at a second RF coupler port of the first pair of RF ports;
    said four RF coupler ports being coupled to respective phasor-shaping networks at each of the four RF coupler ports;
    both the first and second antennas receiving RF signals from each one of the first and second RF transceivers;
    both the first and second RF transceivers receiving RF signals from each one of the first and second antennas; and
    wherein the first and second RF transceivers operate independently in respective frequency bands.

2. The antenna system of claim 1, wherein said phasor-shaping networks comprise at least one of:
    a phasor-shaping circuit,
    a radio frequency (RF) transmission line,
    a radio frequency (RF) switch.

3. The antenna system of claim 1, wherein said phasor-shaping networks comprise at least one of:
    a plurality of phasor-shaping circuits cascaded to effect a phasor shaping function;
    a plurality of radio frequency (RF) transmission lines cascaded to effect a phasor shaping function; and
    a plurality of RF switches cascaded to effect a phasor shaping function.

4. The antenna system of claim 3, wherein the phasor-shaping function dynamically optimizes the isolator for performance is specific current bands of operation of the first and second RF transceivers.

5. The antenna system of claim 1, wherein said phasor-shaping networks comprises:
 a radio frequency (RF) switch that routes RF signals to a global communication accessory interface (GCAI) connector of the portable wireless communication device.

6. The antenna system of claim 1, wherein said phasor-shaping networks comprise reconfigurable radio frequency (RF) components altering a phasor-shaping function.

7. The antenna system of claim 1, wherein said respective frequency bands overlap.

8. The antenna system of claim 1, wherein said RF coupler comprises radio frequency (RF) switches that synchronously operate to effect predetermined changes in RF scattering parameters of said RF coupler.

9. The antenna system of claim 8, wherein said predetermined changes in RF scattering parameters are dynamically effected by a controller hosted in the portable wireless communication device in response to at least one of:
 band of operation;
 currently engaged communication protocol;
 device-hosted sensor information;
 user input;
 LTE and LMR infrastructure network inputs; and
 type and state of device accessories engaged with the portable wireless communication device.

10. A portable communication device, comprising:
 a first antenna;
 a second antenna,
 the first and second antennas being proximally located causing electromagnetic coupling therebetween;
 a first RF transceiver;
 a second RF transceiver;
 an isolator coupled with said first and second antennas and said first and second RF transceivers, said isolator comprising:
  a radio frequency (RF) coupler featuring four RF coupler ports, forming two pairs of RF coupler ports, each pair residing at opposite ends of the RF coupler;
  a pair of coupled RF transmission lines connected between each pair of RF coupler ports;
 the first RF transceiver being connected to a first end of a first coupled RF transmission line at a first RF coupler port of the first pair of RF ports;
 the first antenna being connected to a second end of the first coupled RF transmission line at a first RF coupler port of the second pair of RF ports;
 the second RF transceiver being connected to a second end of the second coupled RF transmission line at a second RF coupler port of the second pair of RF ports;
 the second antenna being connected to a first end of the second coupled RF transmission line at a second RF coupler port of the first pair of RF ports;
 said four RF coupler ports being coupled to respective phasor-shaping networks at each of the four RF coupler ports;
 both the first and second antennas receiving RF signals from each one of the first and second RF transceivers;
 both the first and second RF transceivers receiving RF signals from each one of the first and second antennas; and
 wherein the first and second RF transceivers operate independently in respective frequency bands.

11. The portable communication device of claim 10, wherein the first antenna comprises a land mobile radio (LMR) antenna, and the second antenna comprises a long term evolutions (LTE) antenna.

12. The portable communication device of claim 10, wherein the first antenna is located on a top surface of the portable communication device, and the second antenna is located internally within a bottom portion of the portable communication device.

13. The portable communication device of claim 10, wherein said phasor-shaping networks comprise at least one of:
 a phasor-shaping circuit,
 a radio frequency (RF) transmission line,
 a radio frequency (RF) switch.

14. The portable communication device of claim 10, wherein said phasor-shaping networks comprise at least one of:
 a plurality of phasor-shaping circuits cascaded to effect a phasor shaping function;
 a plurality of radio frequency (RF) transmission lines cascaded to effect a phasor shaping function; and
 a plurality of RF switches cascaded to effect a phasor shaping function.

15. The portable communication device of claim 10, wherein said phasor-shaping networks comprise reconfigurable radio frequency (RF) components altering a phasor-shaping function.

16. The portable communication device of claim 10, wherein said respective frequency bands overlap.

17. The portable communication device of claim 10, wherein said RF coupler comprises radio frequency (RF) switches that synchronously operate to effect predetermined changes in RF scattering parameters of said RF coupler.

18. The portable communication device of claim 10, further comprising:
 a global communication accessory interface (GCAI) connector; and
 the first RF transceiver and second RF transceiver being further operatively coupled to the GCAI connector.

* * * * *